Nov. 22, 1932.   H. K. HARRIS   1,888,599
ADVERTISING AND SIGNALING DEVICE
Filed April 2, 1929   9 Sheets-Sheet 1
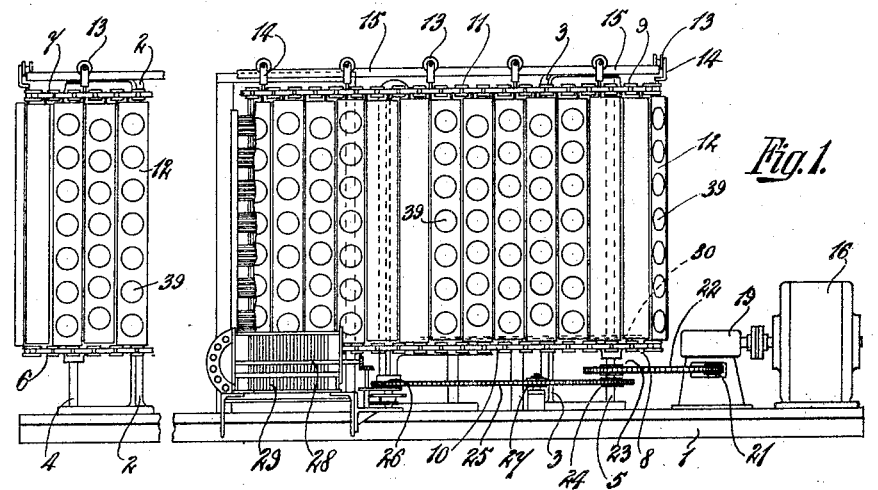
Fig.1.
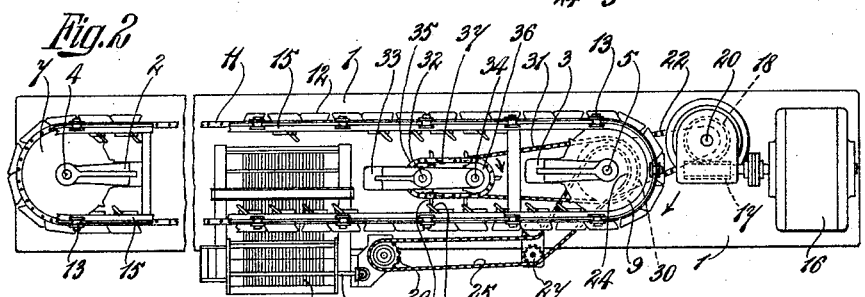
Fig.2.
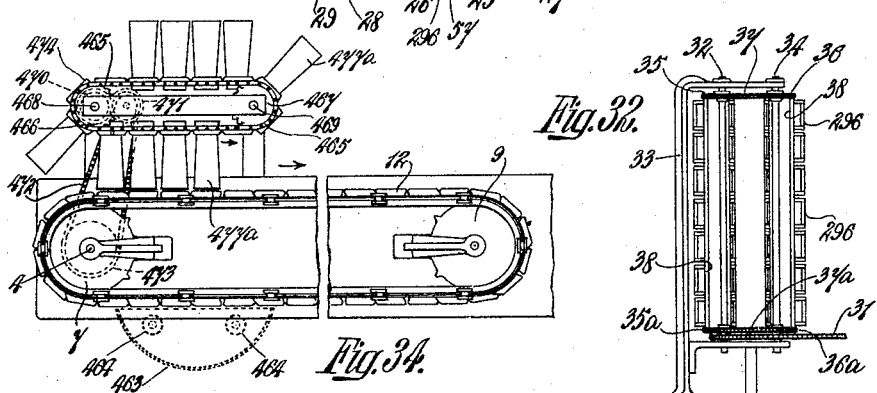
Fig.32.
Fig.34.
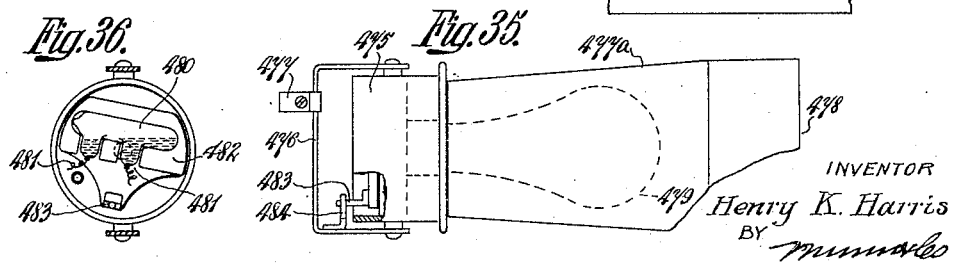
Fig.36.   Fig.35.
INVENTOR
Henry K. Harris
BY
ATTORNEYS

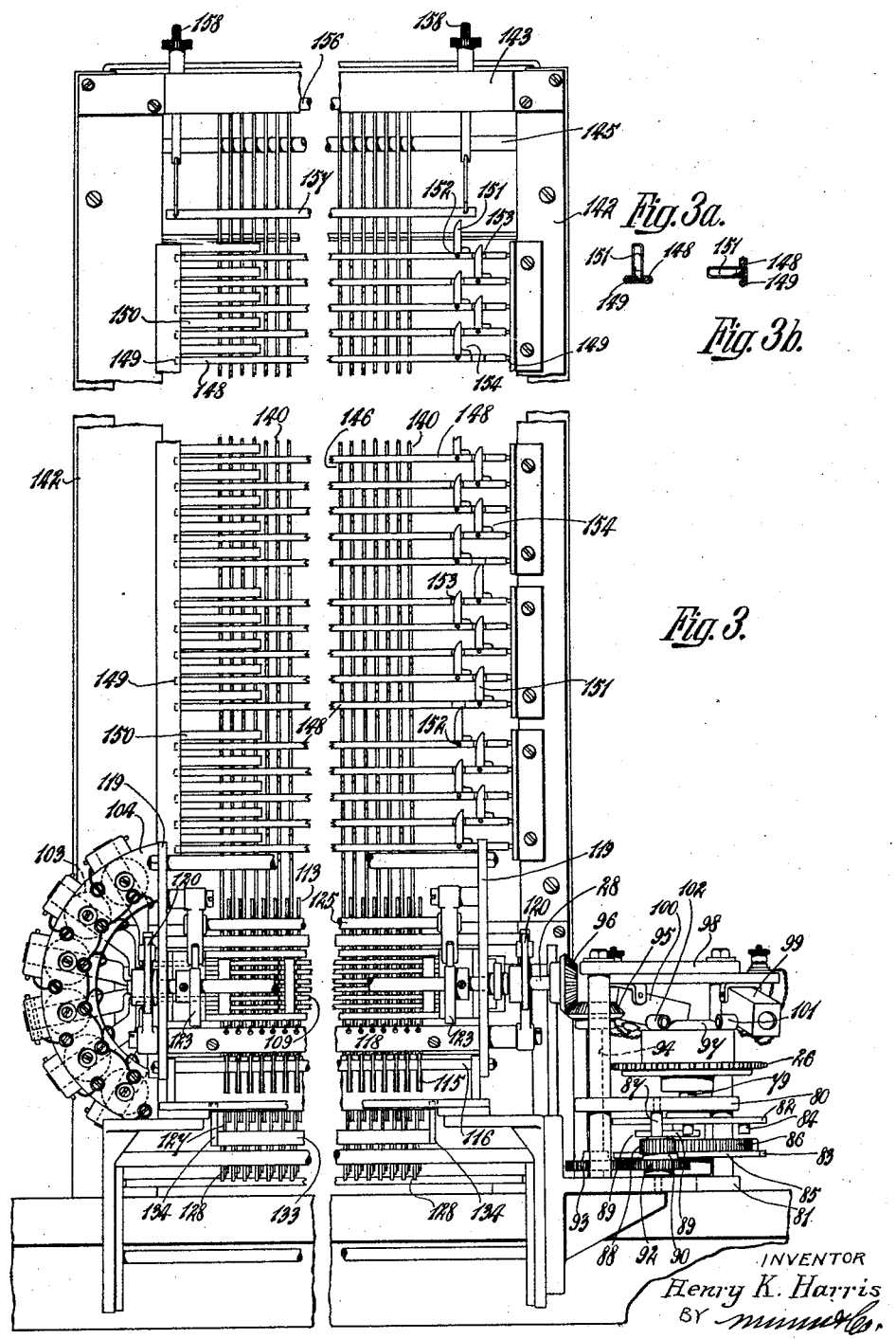

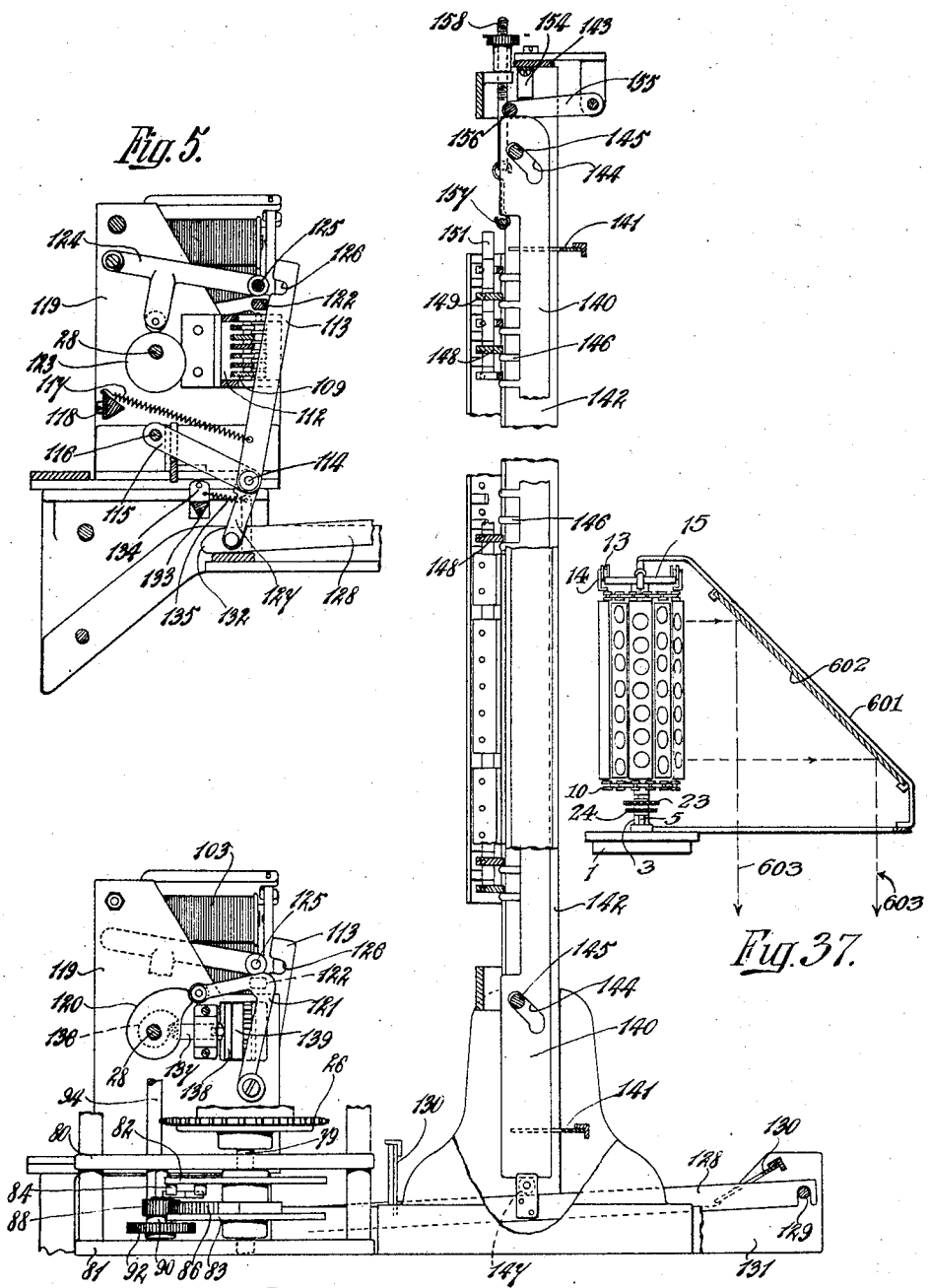

Nov. 22, 1932.  H. K. HARRIS  1,888,599
ADVERTISING AND SIGNALING DEVICE
Filed April 2, 1929    9 Sheets-Sheet 4
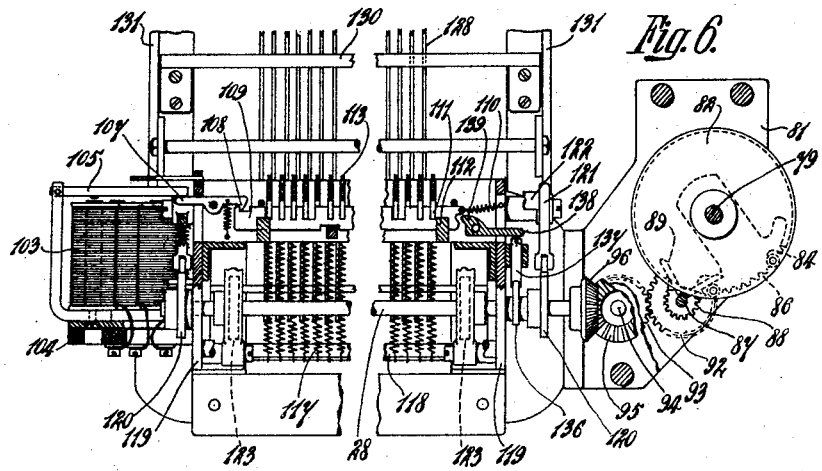
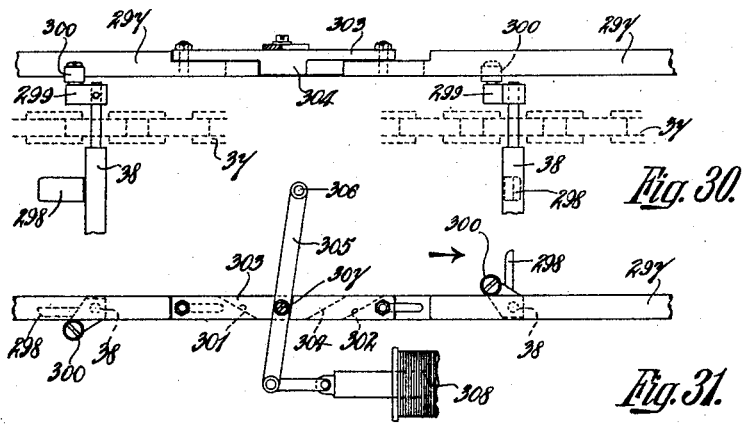
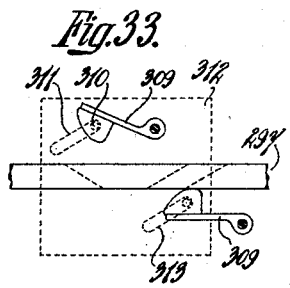
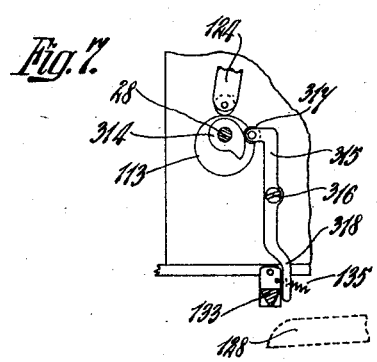
INVENTOR
Henry K. Harris
BY
ATTORNEYS Nov. 22, 1932.  H. K. HARRIS  1,888,599
ADVERTISING AND SIGNALING DEVICE
Filed April 2, 1929    9 Sheets-Sheet 5

INVENTOR
Henry K. Harris
BY
ATTORNEYS

Nov. 22, 1932. H. K. HARRIS 1,888,599
ADVERTISING AND SIGNALING DEVICE
Filed April 2, 1929 9 Sheets-Sheet 6
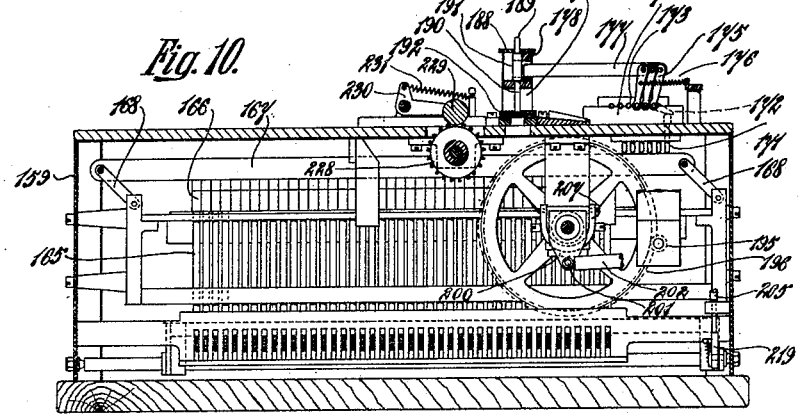
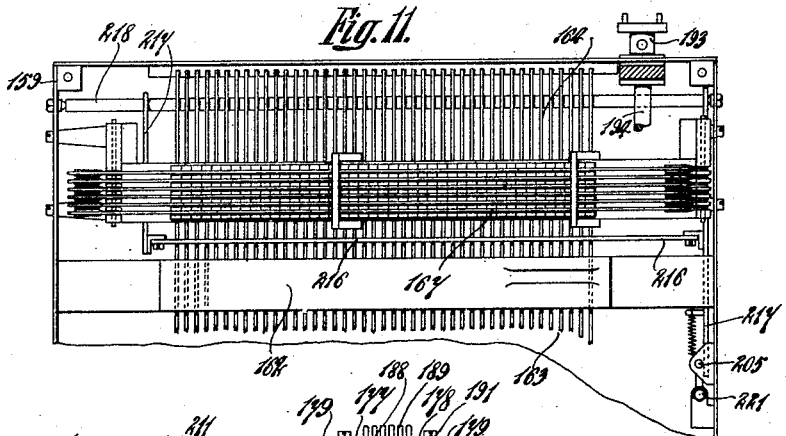
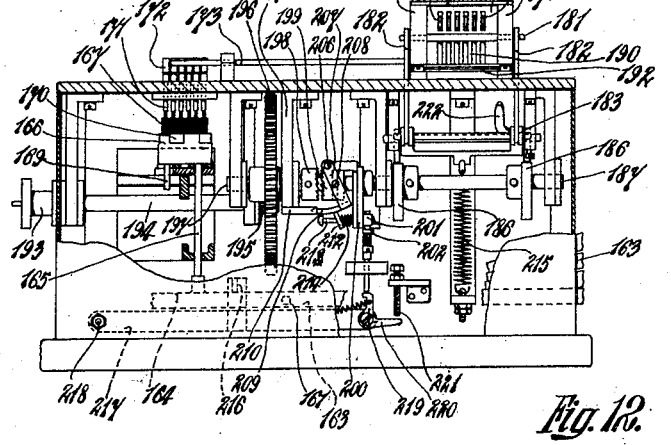
INVENTOR
Henry K. Harris
BY
ATTORNEYS

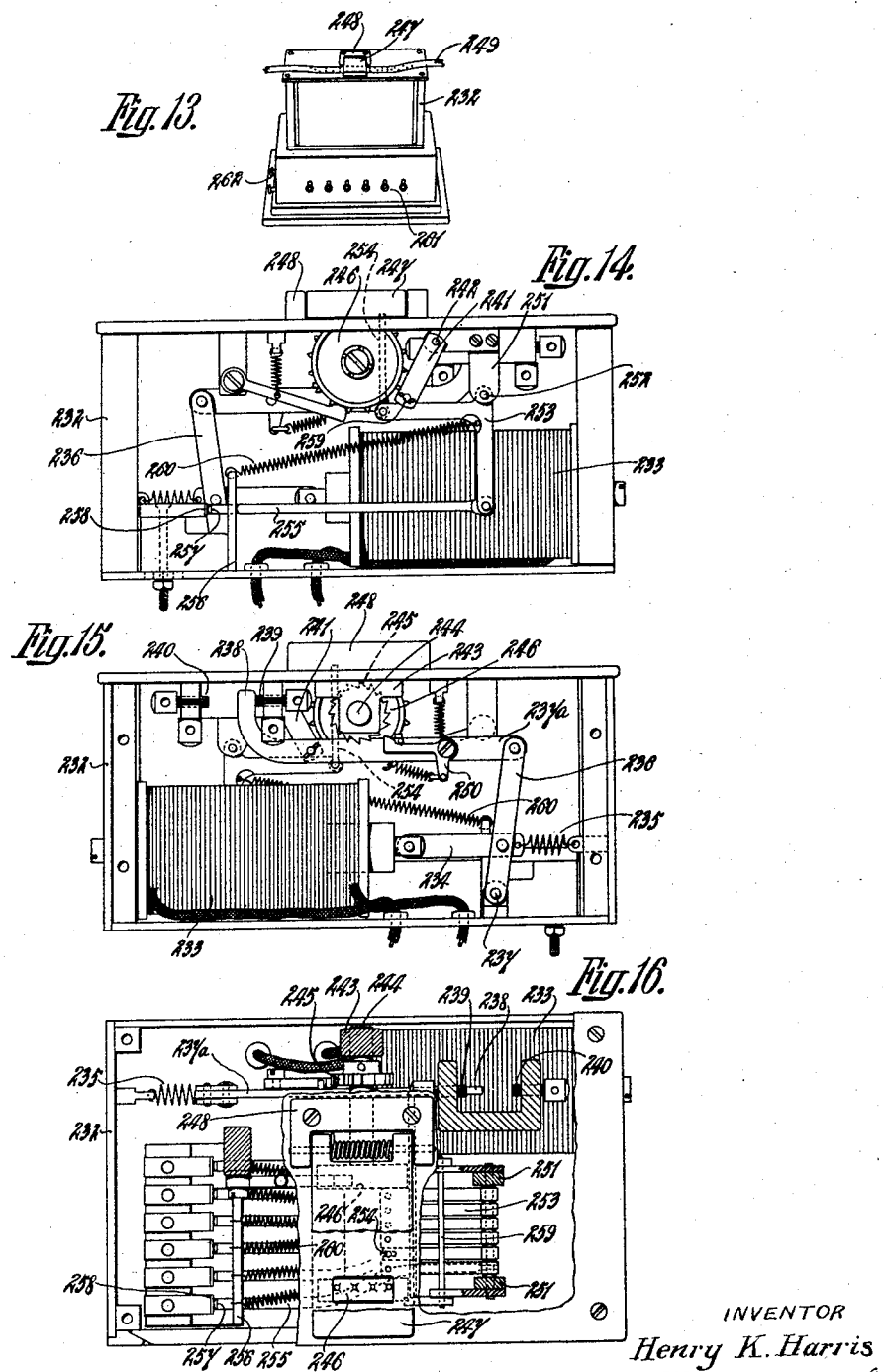

Nov. 22, 1932.  H. K. HARRIS  1,888,599
ADVERTISING AND SIGNALING DEVICE
Filed April 2, 1929  9 Sheets-Sheet 8
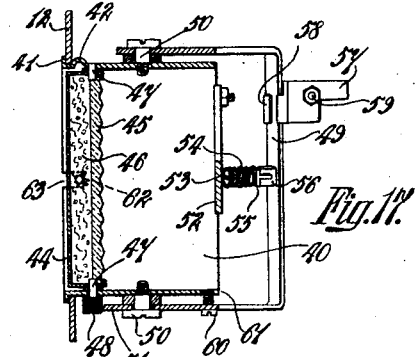
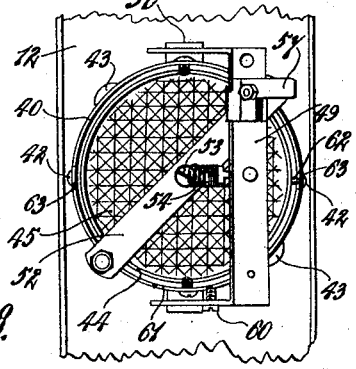
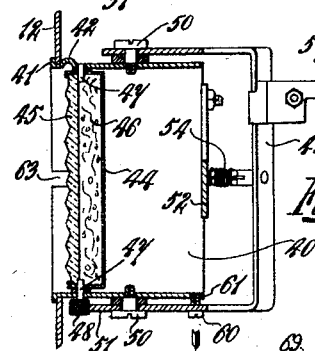
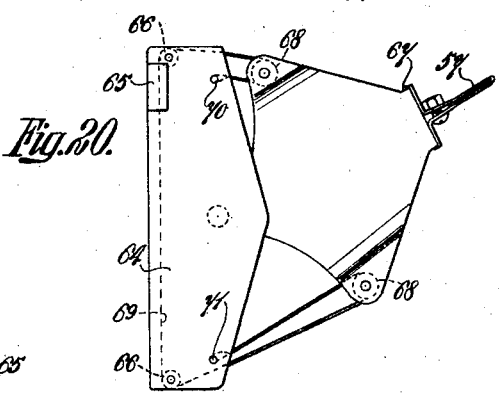
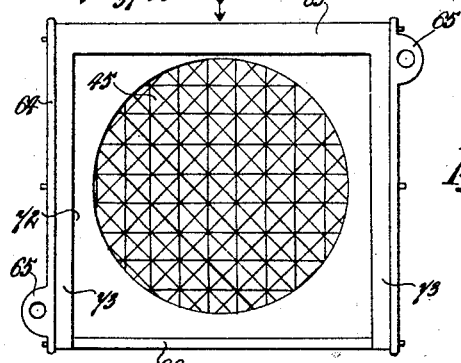
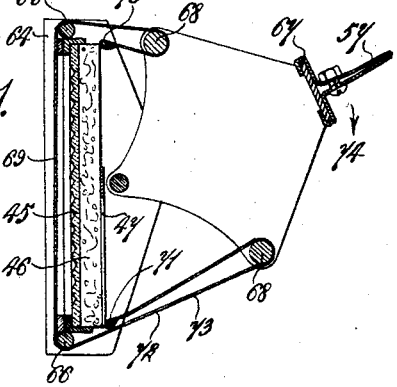
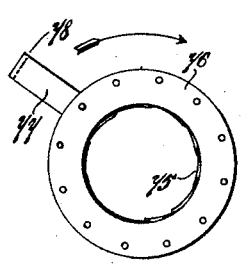
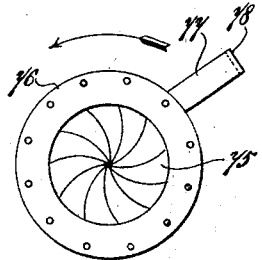
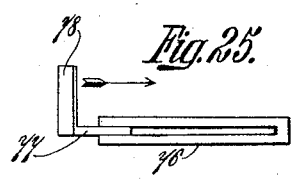
INVENTOR
Henry K. Harris
BY
ATTORNEYS Nov. 22, 1932.  H. K. HARRIS  1,888,599
ADVERTISING AND SIGNALING DEVICE
Filed April 2, 1929  9 Sheets-Sheet 9
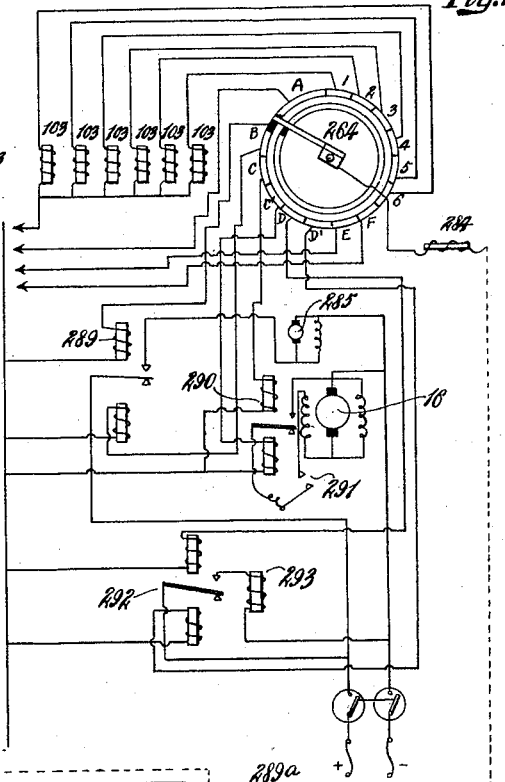
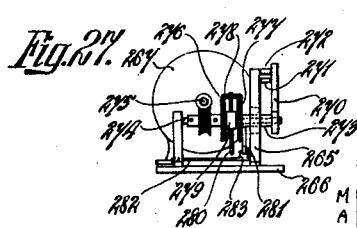
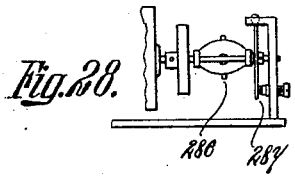
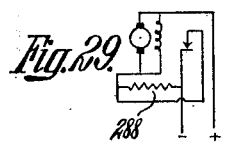
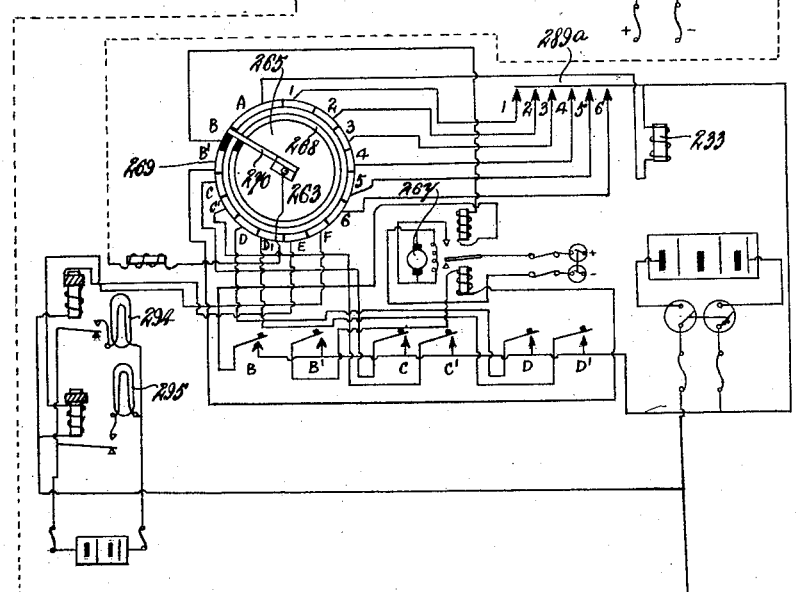
INVENTOR
Henry K. Harris
BY
ATTORNEYS Patented Nov. 22, 1932

1,888,599

UNITED STATES PATENT OFFICE

HENRY KINGSFORD HARRIS, OF WESTMINSTER, LONDON, ENGLAND

ADVERTISING AND SIGNALING DEVICE

Application filed April 2, 1929, Serial No. 351,962, and in Great Britain May 12, 1928.

This invention relates to advertising, signaling, indicating and display devices of the type in which a plurality of visual elements are set or mounted on or with respect to a suitable background and in which any number of said elements are adapted to be set into exhibiting position or to remain at rest, to form letters, words, numbers or other indications, by the selective operation of suitable means which may be a composing means, in association therewith. The elements may be arranged in what may be termed a common field, or in groups to constitute units, which units further may be arranged in rows or banks, or in any other desired manner. The visual elements may be formed or constituted from or by any suitable means, such for example as bands, flaps, discs, plates, slides, spheres, or parts thereof, electric lamps, apertures with light screening means such as iris diaphragms, or by other suitable devices. Associated elements may be of equal or unequal sizes and if desired may differ in shape according to particular circumstances, and further, elements of one kind may in some cases be associated or used in combination with elements of another kind or kinds.

An object of the invention is to mount the selectively operating or composing means in relation to the elements or means carrying the elements in such a manner that they are adapted to have relative movement, and to so constitute the selecting or composing means that members controlled thereby are adapted to be set into the operative or inoperative position. In this manner, upon relative movement between what may be termed the exhibiting means and the composing means, the parts set into the operative position are caused to actuate desired elements to effect the required exhibition.

Another object of the invention is to provide deleting means, which may be mechanical, electrical, pneumatic, or otherwise, for setting back to the non-exhibiting or rest position, at required times, any elements which have been set into the exhibiting position, leaving these elements free to be reset according to the selective operation of the composing or equivalent means.

A further object of the invention is to operate the composing or equivalent means locally or from a distance, either mechanically or electrically, or by any desired combination thereof.

A still further object is to provide a composing means including one or more jacquards, the whole or parts of which jacquards may be set selectively into any desired position by any form of selecting means, mechanically, electrically or otherwise operated, locally or from a distance, to constitute what may be termed "a mechanical relay". This determines the setting of the jacquard or jacquard parts and determines the particular element or elements to be operated thereby.

Yet another object is to provide means for operating the selective portion or portions of the composer. This means may comprise any form of electric transmitter such as a transmitter operated by a perforated tape working on any desired code, the selector being formed to operate and function as a code translator. The transmission may be further by hand over a single or multiple line.

An object of the invention allied with the last mentioned object is to provide perforating means enabling a tape to be perforated from a suitable keyboard or the like, the perforated tape to be utilized in the transmitter. The keyboard may control mechanism for effecting the punching of the tape according to any particular code.

An additional object of the invention is to so form the elements or parts of the elements that they become visible by photoluminescence and means are provided for exciting the photoluminescent substance or substances, which may be applied to or carried by the elements, and if required for damping out the photoluminescence when required. The exciting means may be visible or invisible light, which if required is hidden from the observer and may excite elements through any suitable screens, for example screens for filtering out visible or as far as possible absorbing the rays. Similarly, the excited photoluminescent substances may be dampened out or brought to the condition where they are no longer luminous by subjecting them to the action of light of required wave lengths for the purpose. This light may pass through any desired filter or filters.

Another object allied to the last mentioned object is to provide means for subjecting the elements to light when they relatively pass a certain position. Such means may comprise a lamp or lamps in a desired carrier in conjunction with or without a lens and/or condenser and/or reflector for exciting the elements or surfaces passing thereby. In some cases a stencil or mask may be used to limit or determine the part of the surfaces acted upon or the amount of actuation by exciting or damping out. In some cases where required the photoluminescent surface of the element may normally be turned to the non-exhibiting position, but when it is to be operated, it may be brought to the exhibiting position so that when it passes by the fixed light it is rendered luminous. In other constructions the exciting light may also be movable and be brought into coincidence with the desired element or surface, to travel therewith for a required period to effect the necessary excitement. In this case a plurality of exciting lamps may be carried by any suitable means to move in a required path, which may be endless, and in suitable parts of the path the exciting lamp may be brought into coincidence with the required elements.

A still further object allied with the last mentioned is to provide composing or selecting means for lighting the required lamps of the number moving in the endless path, so that the excitation of the particular elements may be wholly effected by the lighting of the said lamps.

Another object of the invention is to provide an advertising or like device comprising an endless band of plates or slats adapted to be carried by suitable supporting means to move in a required path, past an exhibiting position, the plates or slats carrying any desired numbers of elements. These elements are adapted to be set into the exhibiting or non-exhibiting position by the composing means, or to be rendered luminous when utilized in a photoluminescent system. The plates or slats are preferably arranged vertically although they are not restricted to this position and may be supported by an endless chain or chains running on sprocket wheels adapted to be driven by any suitable means, for example from an electric motor.

Yet another object of the invention in a photoluminescent system is to provide an endless band of plates, slats or the like adapted to be supported in any suitable manner to move in a required path, each of the said plates or slats carrying any required number of lamps or the like to act as exciters in a photoluminescent system. These lamps are adapted to be switched into or out of circuit by any suitable means, preferably by a selecting means, which may control any desired composing means, to light particular lamps in the slats. The lamps in their movements are adapted to be brought into desired positions with respect to elements moving in a similar path, the said elements being of the type carrying photoluminescent substances. Screening and/or condensing or reflecting means may further be provided for concentrating light from the lamps on to the particular element with which it is traveling, for a period, in association.

A further object is to provide advertising or like devices of the type to which the invention relates with reflecting means so that the advertisements, signals, indications, displays or the like are seen as reflections, (1) by means of prismatic or other reflective elements or, (2) the indications formed in whatever manner by shutter or other elements or means, may be reflected in a mirror and so that the elements themselves are not directly seen.

A still further object in an embodiment where the elements are constituted by electric lamps, is to mount the said lamps in a fixed field and in electrical connection with a plurality of fixed contacts carried in an insulated manner, and to provide a plurality of wiping contacts adapted to be moved relatively to the fixed contacts, and to be selectively set, for instance by a composing means, into operative or inoperative positions, according to the desired setting. In this manner the selectively set wiping contacts working over the fixed contacts cause the electric lamps to be illuminated, and by the movements of the wiping contacts the indication is caused to move over the fixed field, the object being to enable systems with lamps to be controlled from a distance over ordinary circuits with keyboard or other transmission, with or without a code.

In order that the invention may be better understood, it will now be described with reference to the accompanying drawings in which:—

Fig. 1 shows a somewhat diagrammatic front elevation of the exhibiting portion of one preferred embodiment of the invention.

Fig. 2 shows a plan of Fig. 1.

Fig. 3 shows a somewhat diagrammatic fragmentary elevation of the composer as utilized in the mechanism shown in Figs. 1 and 2.

Figs. 3a and 3b are details hereinafter referred to.

Fig. 4 shows a fragmentary side elevation of Fig. 2, parts being removed and parts being shown in section.

Fig. 5 shows a fragmentary sectional side elevation of Fig. 2, the view being similar to a portion of Fig. 4, but with the plane of section coming on the other side of the side plate.

Fig. 6 shows a sectional plan of Fig. 3, the plane of section being taken towards the lower part thereof.

Fig. 7 shows a modified detail of construction from that shown in Fig. 5.

Fig. 10 shows a front sectional elevation of Fig. 8, the plane of section being taken through the punch guides.

Fig. 11 shows a fragmentary plan of the perforator shown in Fig. 8, with the cover and certain parts removed.

Fig. 12 shows a side elevation taken from the left hand side of Fig. 8, with certain parts removed and the casing broken away.

Fig. 12a is a detail hereafter referred to.

Fig. 13 shows a somewhat diagrammatic perspective view of a transmitter for utilization in connection with the invention.

Fig. 14 shows a front elevation with the casing removed of a portion of the transmitter shown in Fig. 13, taken from one side, whilst Fig. 15 shows a rear elevation of the transmitter taken from the other side.

Fig. 16 shows a plan with parts in section of the transmitter.

Fig. 17 shows a sectional elevation of one form of element for use with apparatus according to the invention as shown in Figs. 1 and 2, the element being shown in the non-exhibiting position.

Fig. 18 shows a rear elevation of Fig. 17.

Fig. 19 shows a similar view to Fig. 17, but with the parts in the exhibiting position.

Fig. 20 shows a plan of another form of element for use with apparatus according to the invention as shown in Figs. 1 and 2, the element being in the non-exhibiting position.

Fig. 21 shows a similar view to Fig. 20 but in section, the plane of section being taken through the centre of the element.

Fig. 22 shows a front elevation of the element shown in Figs. 20 and 21, with the parts in the exhibiting position.

Fig. 23 shows a somewhat diagrammatic front elevation of a portion of another element constructed according to the invention, the parts being in the non-exhibiting position.

Fig 24 shows a similar view to Fig. 23, but with the parts in the exhibiting position, (either may be the exhibiting position according to the arrangement of the surfaces).

Fig. 25 shows a plan of the element shown in Figs. 23 and 24.

Fig. 26 shows a diagram of the electrical connections.

Figs. 27, 28 and 29 are details connected with the diagram shown in Fig. 26.

Fig. 30 shows to an enlarged scale an elevation of the upper part of a portion of the device shown in Fig. 1, to illustrate the deleter action.

Fig. 31 shows a plan of Fig. 30.

Fig. 32 shows a somewhat diagrammatic front elevation of the deleter, taken from the front of Fig. 2, with the surrounding parts removed.

Fig. 33 shows in plan an additional mechanism for use with that shown in Fig. 31.

Fig. 34 shows in plan two methods of effecting the excitation of photoluminescent elements.

Fig. 35 shows to a larger scale details of an exciting source of illumination in accordance with one of the methods shown in Fig. 33.

Fig. 36 shows a rear elevation of a portion of Fig. 35.

Figure 37 is a side elevation illustrating diagrammatically the application of a reflecting means to my exhibiting device as shown in Figure 1.

Figure 8:
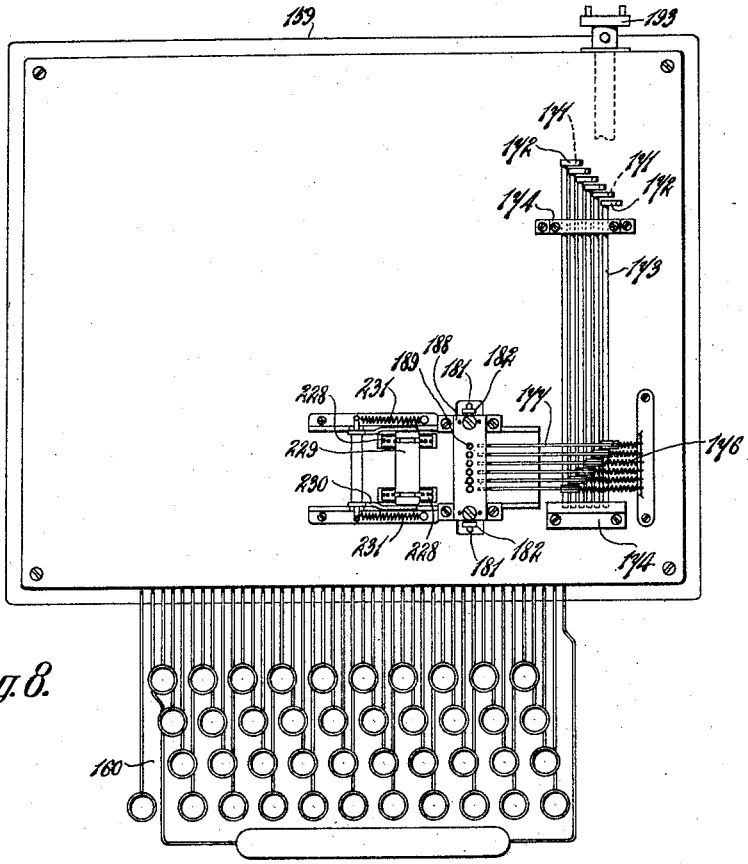
Fig. 8 shows a plan of a perforator.

Referring to Figs. 1 and 2, which figures show diagrammatic views of a preferred embodiment of the invention, 1 is a base or support upon which the mechanism is mounted, which base or support may itself be carried in any suitable manner according to the position of the apparatus. The base 1 has mounted thereon two bearing standards 2 and 3. The bearing 2 supports a vertical shaft 4 and the bearing 3 a vertical shaft 5. On the shaft 4 are mounted two sprocket wheels 6 and 7, the first of which comes towards the lower end and the second towards the upper end. Similarly, the shaft 5 supports two other sprocket wheels 8 and 9, 10 and 11 are endless sprocket chains, the former passing around the sprocket wheels 6 and 8 and the latter around the sprocket wheels 7 and 9. Vertically arranged between the chains 10 and 11 are slat members 12 of sheet metal, preferably aluminium or aluminium alloy, the upper ends of which are bent round and perforated to engage with perforated pins extending from the sprocket chains 10 and 11. To support the weight, a number of runners 13 comprising flanged wheels are provided, the spindles of which have hangers 14 in turn connected to the chain 11. The upper portions of the bracket bearings 2 and 3 support a runway 15 comprising two parallel rails joined at the ends by semi-circular portions coming above the sprockets 7 and 9. In some cases separate supporting means are provided for the rails and the sprocket driving means.

16 is an electric motor mounted upon the base 1, the shaft of which carries a worm 17 meshing with a worm wheel 18 carried by a suitable bearing 19 enclosed in a gear box. The shaft 20 of the worm wheel has mounted thereon a sprocket wheel 21 around which passes a sprocket chain 22, which also passes around the sprocket wheel 23 towards the lower end of the shaft 5. By this means the drive is communicated to the shaft 5 and from the shaft 5 through the sprockets 8 and 9, which are of equal size and also equal in size to the sprockets 6 and 7, and finally to the shaft 4.

The shaft 5 carries another sprocket wheel 24 around which passes a chain 25 to a sprocket wheel 26, the chain 25 being directed by guide sprockets 27. The sprocket wheel 26 is connected through suitable mechanism hereafter to be described with reference to Figs. 3, 4 and 6, to the operating shaft 28 of what is herein termed a composing mechanism shown extremely diagrammatically and given the reference numeral 29 in Figs. 1 and 2.

The shaft 5 carries another sprocket wheel 30 around which passes a chain 31 to a sprocket carried at the lower end of a vertical shaft 32. This vertical shaft 32 is carried by a bracket 33 attached to the base 1. The bracket has bearing portions at its upper and lower ends for supporting two parallel vertical shafts, the first 32 hereinbefore mentioned and another 34. The shafts 32 and 34 carry towards their upper and lower ends sprocket wheels connected by sprocket chains. In the drawings, in Fig. 2, only the upper sprocket wheels 35 and 36 are shown connected by a chain 37, but in Fig. 32 it will be seen that the lower sprocket wheels 35a, 36a, and chain 37a come immediately below those shown in Fig. 2. The chains 37 and 37a are spaced apart substantially the same distance as the chains 10 and 11, and the chains 37 and 37a are connected by vertical rods 38, so that these rods move parallel with the slats 12 but at a much greater speed. The upper ends of these rods 38 are shown in Fig. 30, and the whole device constitutes a deleting means to be hereafter fully described.

When the motor 16 is running, it will be understood that a drive is imparted to the parallel slats 12 so that these move round in an endless path remaining vertical and parallel. As will be realized from Figs. 1 and 2, the slats may be provided on the chains to any number, according to the length of the chains 10 and 11. Similarly, it will be understood that the deleter is driven so that its vertical rods move parallel with the slats 12, but at a much greater speed for the purpose hereafter explained, and finally, it should be understood that the drive is imparted intermittently to the shaft 28 of the composer from the sprocket wheel 26 by intermediate mechanism to be hereafter explained.

The slats 12 carry a desired number of elements 39, the elements being arranged in desired groupings, for example as shown in Fig. 1 where it will be seen that five successive slats each carry seven elements spaced at desired distances apart to enable monogramic indications to be formed, each group of five slats being followed by two blank slats 12.

The elements may be of any desired form and are such that each element can be set into two positions, the exhibiting or non-exhibiting, or/and can be brought to two conditions, also the exhibiting and non-exhibiting. In the former case the element may be such that in the non-exhibiting position it matches its background, whilst in the exhibiting position it makes a desired contrast to the background. In this manner when desired elements of a group are set from the non-exhibiting position to the exhibiting position a desired indication is made visible. In the latter case, whch is particularly suitable for use at night or in dark places, the elements include in their exhibiting portions, photoluminescent materials which when excited by a suitable source of visible or invisible light, contrast with their background. However with a photoluminescent system, in some cases the elements may also be moved from a non-exhibiting to an exhibiting position. In this manner, photoluminescent elements may be utilized both by day and night, in the first case contrasting with their background when in the exhibiting position owing to the mechanical movements, and at night further contrasting with the background owing to their excitation by a suitable source of light.

Figs. 17, 18 and 19 show one form of element particularly suitable for use with the slats 12. This element comprises a hollow cylindrical portion 40 formed at one end with a flange 41 and having projections 42 spaced the thickness of the metal of the slats 12 from the flange 41. The slat 12 has a circular aperture of the diameter of the exterior of the cylinder 40, and in certain positions this aperture has spaced notches 43, (see Fig. 18). By this means the cylinder 40 can be inserted from the front of the slat 12 as the projections 42 come in the same angular position as the notches 43 and consequently these projections 42 pass through the notches 43 and then by turning the cylinder through a desired angle, the projections 42 come behind the material of the slat 12. The parts are held in position by a small locking screw passing through the material of the slat into a notch in the flange 41 or by other similar means.

The cylinder 40 has pivotally mounted therein a circular casing 44 having at the front a glass 45, the surface of which is formed as shown in Figs. 17 and 18, a cushioning backing 46 being provided in the casing 44, the glass being held in position by a flange on the casing. The casing 44 is provided with diametrically opposite pivots 47 which take their bearing in the material of the cylinder 40 and one of which carries on the exterior a toothed pinion 48. 49 is a yoke, the arms of which are pivotally mounted at 50 on the cylinder 40. One arm of the yoke is extended at 51 and at its end is formed with teeth to mesh with the pinion 48. 52 is a cross bar or piece mounted diametrically across the inner end of the cylinder 40. This cross piece at the centre is provided with a projection or screw 53 around which one end of a compression spring 54 is mounted. The other end of the compression spring comes around a projection on a jointed member 55, pivotally jointed to a fork member 56 carried at the centre of the underside of the yoke 49. 57 is a lug formed with a clamp 58 adapted to be fastened in any suitable position on the yoke 49 by means of a clamping screw 59.

Two stop means are provided. One of these stops comprises a screw 60 carried by one arm of the yoke 49 working in a notch 61 in the end of the cylinder 40. The casing 44 also carries a projecting pin 62 which engages in and comes against the ends of slots 63 in the forward end of the cylinder 40.

It will be realized that the compression spring 54 keeps the element in the exhibiting or non-exhibiting position and with the parts in the position shown in Figs. 17 and 18, if the lug 57 is moved from the right to the left (Fig. 18), then the pinion is operated from the yoke to turn the casing 44 through 180 degrees. This brings the glass surface 45 to the exterior and into the position shown in Fig. 19. During this movement, the spring 54 passes over the dead centre so that the spring acts to complete the movement which is limited by the pin 62 coming to the end of the other slot 63. Fig. 19 shows the exhibiting position into which the parts have been set and it will be realized that the glass surface has been brought to the exterior. If the back of the glass is silvered and the front surface of the slat 12 is a dull dark, for example a black matt surface, then a contrast is given, enabling the element to be seen.

In certain cases it is preferable to make the element photoluminescent and for this purpose a suitable photoluminous material is disposed behind the glass. In all cases the glass may be made of any suitable kind such as Vitaglass. For the screens, Vitaglass or other special or suitable glass may be used, flashed to give required colour to allow certain exciting rays to pass therethrough, but for absorbing other rays.

Another form of element is shown in Figs. 20 to 22. In these figures, 64 shows a casting, which may be a die-casting, somewhat rectangular in shape provided with lugs 65 by which it is attached to the rear surface of the slat 12. In this form the glass 45 is carried by a suitable part of the framework and has a suitable backing 46 held in place by a strip spring 47, the ends of which come beneath lugs projecting from the rear portion of the casting. The casting has mounted therein parallel rollers 66 and has pivoted thereto a yoke member 67 carrying the adjustably positioned lug 57. The side members of the yoke have pivotally mounted therebetween other rollers 68. 69 is a blind forming a shutter, one end of which is secured at 70 to a cross bar extending across the side plates of the casting, whilst the other end is connected to another cross bar 71, also between the side plates of the casting. The blind 69 passes from the fixed end 71 around one of the rollers 68 then around a roller 66, across the front of the element, around the other roller 66, around the other roller 68 to the other anchorage 70. The material of the blind 69 extends from side to side, except towards one end 72 which only comprises two strip portions 73 at the sides. When the element is in the position shown in Figs. 20 and 21, the material of the blind comes in front of the glass 45. When however the lug 57 is moved in the direction of the arrow 74 (Fig. 21) then the upper roller (Fig. 21) pulls the material of the blind upwards over the glass and brings the portion with the gap bounded by the strips 73 over the glass (the position shown in Fig. 22). This exposes the exhibiting surface. It will be realized that in the form shown in Figs. 20 to 22, the element may be made photoluminescent.

In some cases the blind shutter 69 in place of exposing or screening the exhibiting surface, may uncover an aperture or the like and enable light to shine through the said aperture. Other forms of shutter for opening and closing an aperture to reveal an exhibiting surface or a source of light may be provided, for example having the structure of an iris diaphragm. Such a construction is diagrammatically shown in Figs. 23, 24 and 25, in which 75 are the leaves of the iris diaphragm, 76 the outer carrying ring on which they are mounted, and 77 the actuating lever having a turned round end 78. When the parts are in the position shown in Fig. 23 the leaves 75 cover the aperture, but when moved in the direction of the arrow in this figure, the leaves are withdrawn to uncover the aperture. The turned round end 78 in this construction replaces the bar 49 to carry an adjustably positioned lug such as 57 used in the other constructions.

The composer shaft 28 is driven from the sprocket wheel 26 in the following manner. The sprocket wheel 26 is mounted upon a shaft 79 (Figs. 3, 4 and 6) supported between bearing plates 80 and 81. Two discs 82 and 83 are provided, mounted upon the shaft 79 between the bearings 80 and 81, which are preferably ball bearings. The upper of these two discs 82 has two driving pins 84, whilst the lower disc 83 has a cutaway portion 85. The lower disc 83 carries a portion of a toothed wheel having teeth 86 which come substantially in the circumferential position immediately beneath the pins 84.

87 is another shaft mounted between the bearing plates 80 and 81. This shaft 87 has mounted thereon a pinion 88 in such a position that it may be engaged by the teeth 86. The pinion 88 on its upper surface carries two Geneva-like arms 89 (Figs. 3 and 6) and on the underside the pinion 88 has a shaped portion 90 with a circumferential recess therein in which the circumferential edge of the disc 83 is adapted to take. The arrangement is as follows. The sprocket wheel 26 is being constantly driven and the shaft 79 carries round with it the discs 82 and 83, together with a partial gear wheel 86. The circumferential edge of the disc 83 for a greater part of the rotation engages the circumferential notch in the portion 90 beneath the pinion 88, but when the pins 84 come into the position shown in Figs. 3 and 6, the circumferential gap 85 in the plate commences to pass by the shaped portion 90, thus leaving the pinion 88 free to be turned. The pins 84 engage the Geneva arms 89 and turn the pinion 88 so that its teeth come into engagement with the teeth 86. It should be remarked that the pinion 88 does not have a complete circumference of teeth but that in the neighborhood of the arms 89, the teeth are removed. When the first pin passes the Geneva arms 89 as before stated the pinion is caused to rotate, whilst when the second pin 84 passes the Geneva arms, the rotation of the pinion ceases and it is held locked by the plate 83.

The timed rotation of the pinion 88 is imparted from the gears 92 and 93 to the vertical shaft 94 carrying at the top the bevel wheel 95 meshing with the bevel wheel 96 on the shaft 28.

The shaft 79 also carries a cam 97 of insulating material and a framework or bracket 98 supports above the said cam rocking mercury switches 99 and 100 having rollers 101 and 102 respectively, engaging the cam. These mercury switches are thus caused to rock in a timed manner from the shaft 79 to make and break connection in certain circuits to be hereafter referred to.

The composer referred to as 29 in Figs. 1 and 2 and shown more fully in Figs. 3, 4, 5 and 6, comprises an electrically operated permutation selector, which can also be operated if desired pneumatically or by other means. This is designed to operate with a six-contact code and comprises six electro-magnets 103 carried by a suitable arc-shaped plate on which is also mounted a strip 104 of insulating material. Each electro-magnet 103 has an armature 105 and the free ends of all of the armatures are shaped to come over the tails of six spring controlled levers 107. Only one of these levers is shown in Fig. 6, but it will be understood that six are arranged side by side on a common spindle. Each lever comprises a hooked nose 108 adapted to engage with a recess in the end of a sliding bar 109. Each sliding bar 109 is kept pulled to the right (Fig. 6) by a spring 110 and each sliding bar is provided with recesses or notches 111 in various positions. The sliding bars 109 are shown in section in Fig. 5 and it will be seen that they are all adapted to slide in comb guides 112 arranged in suitable carrying plates.

The notches 111 in the permutation sliding bars 109 are so relatively arranged that by releasing one or more so that they are pulled to the right by their associated springs 110, a common groove is formed through all the bars in various positions, the position of the common groove depending upon which particular bar or bars are released. In this manner, if opposite to the grooved edges of the sliding bars 109 a number of latches are arranged, one coming in each possible position for the common groove, and if in the course of the operation, the whole of the latches are pressed against the grooved surface of the bars 109, then the latch which comes opposite the common groove will enter the said groove. Such a construction is employed and 113 are the latches. Each latch 113 is pivoted at 114 to an associated link 115 working in a suitable comb guide and the links 115 are pivotally connected to a common spindle 116. Each latch has associated therewith a tension spring 117 tending to pull it towards the left (Fig. 5), the ends of the springs being anchored to a common cross bar 118. The latches are thus, as will be seen from Fig. 5, kept pulled towards the permutation bars 109. The composer includes side plates 119 which carry the bearings for the shaft 28, and outside these side plates the shaft 28 carries cams 120 on which followers carried by levers 121 are kept pressed by suitable spring means. The levers 121 carry between them a resetting bar 122 and this bar 122 is adapted as shown in Fig. 5 to press against the latches 113 and hold them away from the sliding permutation bars 109. The shaft 28 between the side plates carries other cams 123 co-operating with followers carried by levers 124, the free ends of the levers carrying a transverse rod 125 between them. Each latch towards the upper end has a notch 126 therein which comes opposite to the rod 125 when the latter is in its lowermost position.

The action of this part of the mechanism is as follows. When the permutation bars have been set by the actuation of certain of the electro-magnets 103, the armatures of which when attracted operate the associated levers 107 to cause their hooked ends to release the particular bars 109, then in the operation of the apparatus, the shaft 28 is turned.

The cams 120 first cause the bar 122 to be moved to the left (Fig. 5) away from the latches 113. The springs 117 are consequently free to pull all the latches towards the left. In a certain position, as before explained, a common groove has been formed across the whole of the sliding bars 109. The latch coming opposite this common groove is pulled thereinto by its spring 117. The notch 126 of the latch 113 which has been pulled to the left engages over the rod 125 and in the further operation of the machine the cams 123 cause the levers 124 to rise so that the rod 125 lifts the particular latch 113.

Each latch is connected by a link 127 with one end of an associated somewhat horizontally extending lever 128. These levers 128 are mounted on a common spindle 129 and guided by comb plates 130 mounted between side plates 131. The free end 132 of the lever 128 is formed as a nose and as it rises is adapted to contact with one inclined surface of a locking bar 133 (Fig. 5). This locking bar extends completely across the machine and is carried by side levers 134 (only one of which is shown) and is kept pulled towards the right (Fig. 5) by a spring 135. When the lever 128 is in the upper position, it rests on the top horizontal surface of the bar 133, and in rising, any previous lever retained by the bar has been allowed to fall. After the above action has taken place, the cam 120 continuing its rotation again forces the levers 121 to the right (Fig. 4) and this causes the bar 122 to press on the latch 113 which is engaged in the common groove formed by the bars 109, and push this to the right. When the latch has been cleared, another cam 136 on the shaft 28 through a tappet 137 operates a spring-returned lever cam device 138 (Fig. 6), the shaped end 139 of which is adapted to engage the ends of all the sliding bars 109. By the operation of the lever device 138, those sliding bars 109 which have been moved to the right (Fig. 6) by their springs 110 are moved to the left until the notch at the other end springs past and is engaged by the associated hook 108. In this manner the permutation bars 109 are reset ready for further operation.

The drive of the code machine may be so arranged that it is only operated when one or more impulses have been sent, for example clutching means may be provided, which is only brought into action if one or more of the permutation bars 109 are released by one or more impulses being sent.

Each lever 128 comes beneath the vertically movable jacquard bar 140 adapted to move in comb plates 141 carried by side frames 142 braced together in any suitable manner and having a top member 143 to form a rigid rectangular framework. Each jacquard bar 140 is formed with inclined slots 144 and the jacquard members 140 are threaded over transverse rods 145 by means of these slots. One edge of each jacquard bar carries in suitable positions according to desired arrangements a number of projections or teeth 146. These projections or teeth come in various positions and groupings on the bars according to some predetermined arrangement. Each bar 140 comes vertically above a lever 128 and the lever 128 carries the bearings for a roller 147 upon which the end of the associated bar 140 rests. In this manner, when the lever 128 is raised, as before explained, it raises its associated bar 140. In rising, the said bar 140 not only moves vertically but owing to the inclined slots 144 working over the bars 145, it also moves in a direction parallel to the slots 144, and it will be understood that the teeth 146 have the same movement.

A number of horizontal bars 148 extend across the side frame 142. These bars 148 are rectangular in cross section as shown in Fig. 4, and towards one narrow edge at each end they are formed or provided with pivots 149. These pivots take in suitable members associated with the side frames 142 in such a manner that the bars 148 are free to be turned upwards about their pivots 149. The bars 148 extend into the paths of the pins 146 and consequently when any particular bar 140 is moved upwards, these pins or projections 146 cause certain of the bars 148 to be turned upwards. In turning upwards one end comes against an associated flat spring 150 which is stressed to effect the return of the bar 148 when the bar 140 again falls. Each bar 148 carries a projecting member 151 pivotally attached thereto at 152. As will be seen from Fig. 3, the projection 151 on each successive bar is staggered in such a manner that the projection 151 on one bar comes into a gap 153 on the next succeeding bar, the gap 153 being provided merely for clearance purposes.

Fig. 3a shows a side elevation of one bar 148 with its associated projection 151 in the position of rest, and Fig. 3b shows a similar view when the bar 148 has been turned and from these figures it will be understood that by the turning the particular bar or bars 148 which have been turned, bring their projections 151 to project outwards beyond the projections 151 on those bars 148 which have not been operated. Springs are associated with the pivots 152 to keep the projections 151 in position normally at right angles with respect to the surfaces of the bars 148, the action being assisted by a stop or heel 154 on each projection 151 which prevents any further movement to the right from that shown in Fig. 3 (about the pivots 152), but permits slight movement to the left against the action of the spring, which spring acts as a cushioning means.

When turned to the position shown in Fig.

3b, that is to say when a bar 148 is turned about its pivot 149, it brings its associated projection 151 into the path of a lug 57 or the like associated with the unit (Figs. 17 to 25). Each element 39 is provided with such a lug or its equivalent and consequently in the particular case under discussion, as the elements are arranged in vertical rows of seven on a slat 12, and as five slats are associated to form a monogramic group (see Fig. 1) it follows that there are thirty-five lugs or their equivalents 57 to be operated in each group. Consequently, it is necessary to have thirty-five projections 151, any one or more of which may be set into position to co-operate with a lug 57 or the like.

It should be here explained that the composer and the path of the slats are so associated and relatively arranged that when the projections 151 are in the position shown in Figs. 3 and 3a the projecting lugs 57 or the like pass by the projections 151 and do not come into contact therewith, but when any projection is turned to the position shown in Fig. 3b it projects into the path of a lug 57.

To bring the lugs 57 into the correct position to be operated, they are clamped to their yokes 49 in certain positions and it will be understood that, taking the upper five elements 39 in the five associated slats 12, it will be possible to set the said lugs 57 on their yokes 49 so that one lug is operated by the projection 151 say on the first bar, whilst the next lug is operated by the projection on the next bar and so on for the first five bars, and in this manner each lug 57 may be brought to have an association with a particular projection 151.

The association of the rods 148 with the elements 39 is somewhat diagrammatically shown in Fig. 1 and from this it will be seen that each succeeding more or less horizontal row of elements passing downwards from the upper row has associated therewith a group of rods 148, the projections 151 of which it will be understood are arranged in the manner already described.

The action of the foregoing is as follows. Assuming the endless band of slats 12 to be in motion, then, according to the setting of the electro-magnets 103, so certain projections 151 are set into the projecting position. When the next monogramic group of elements passes the composer certain lugs 57 will come against the projections 151 which have been brought into the operating position. The contact will be cushioned by the spring at the hinge 152 and the projections 151 will cause impediment to the passage of the lugs 57. The arrangement of the parts is such that this impediment will cause the yoke to be moved about its pivots 50 to the other side of the dead centre position of the spring 54, which will cause the element to be brought from the non-exhibiting position to the exhibiting position. When the glass or the like of the element is in the exihibiting position, the pull on the chains 10 and 11 causes the lug 57 to force its way past the projection 151, by causing this to move down against the action of its spring hinge. In this manner the desired elements are set into the exhibiting position.

The timing of the apparatus is such that after one monogramic group of elements has passed the composer, the parts of the composer return to the inoperative position and are reset to the new operating position by the time the next monogramic group of elements comes into association therewith.

The levers 128 and bars 140 which have been set into the upper position, fall by their own weight and this movement is assisted by a spring 154 beneath the upper frame member 143 (Fig. 4) which forces down the levers 155 pivoted to this upper member, carrying between them a bar 156 which bears upon the tops of the bars 140.

When it is desired, for example in setting up the mechanism to hold all the bars 140 in the upper position, this is accomplished by a cross bar 157 carried by pendant means from adjusting screws 158 carried by the top member.

The electro-magnets 103 are operated in one arrangement from a suitable electric circuit by means of a tape perforated according to a code. For the purpose of preparing this tape, a perforator as shown in Figs. 8 to 12 is provided. This comprises a casing 159 of suitable construction and a keyboard 160. All the key levers 163 are pivoted to suitable pivoting means 161 suitably carried by a bearing member 162 towards the base of the casing. In this way, when any key is depressed, the rear portion 164 thereof rises up. Guide combs of any suitable nature are provided for positioning and guiding the lever. The rear portion 164 of each key lever has resting thereon a rising and falling pin 165 working through suitable guides. The upper end of each pin 165 carries a plate 166 and each plate comes beneath six parallel links 167, the ends of which are pivoted to levers 168 supported in bearing members in the casing. Each plate 166 in addition to the pin 165 is guided in its vertical movement by a pin guide 169, and each plate is notched on its upper edge with a notch or notches 170, the position of the notch or notches varying with the plate. By this means one or more of the links 167 are raised when a key is depressed, and the associated groupings of the links 167 vary with each key according to a certain code. Above the links 167, towards one side of the casing, are arranged six pins 171 working in suitable guides. These pins project from the top plate of the casing and each one comes beneath an associated lever 172. Each lever 172 is mounted upon a spindle or stem 173 so that six parallel spindles are provided (Fig. 8). These are mounted in suitable bearings 174 and in suitable positions each one has mounted thereon a lever 175 kept pulled to the right (Figs. 8 and 9) by a tension spring 176. The upper end of each lever 175 has pivoted thereto a strip-like member 177, the other end of which is free, and enters a recess in a sliding member 178 (the sliding member is shown clearly in Fig. 12). The sliding member works between two vertical guides 179 mounted on the top plate of the casing, slotted at 180 for the passage of a suitable spindle or shaft 181. To the projecting ends of the spindle 181, the upper ends of links 182 are pivoted. These links 182 pass through slots in the upper surface of the casing to the interior and their other ends are pivoted to one end of a lever member 183 pivoted at 184 to a bearing bracket. The other arm of the lever member 183 carries at each side a cam follower 185. The cam followers co-operate with cams 186 on a shaft 187 carried by suitable bearing brackets on the interior of the casing.

188 is a member connecting the upper ends of the guides 179. This member 188 is perforated to form a guide for the upper ends 189 of six punches 190. Between the portions 189 and 190, the punches are formed with slots 191 in such a manner that a slot 191 comes opposite to the free end of each member 177.

The operation of this part of the mechanism is as follows. When a key is depressed, it raises a plate 166 and according to the notch or notches in the plate, so one or more of the links 167 are raised. The link or links raise one or more of the pins 171, and this causes the associated spindle or spindles 173 to be turned, in turn causing the particular lever or levers 175 to move a member or members 177 so that the free end or ends thereof come into the associated slots 191.

By this means, when the slide 178 is pulled downwards in a manner hereafter explained, it carries with it the particular punches into which the members 177 have entered, causing the lower end thereof to perforate the paper which passes through the guides 192 beneath the punches and leaving the upper punches resting on the paper. Consequently the paper is punched in accordance with the key depressed.

An electric motor (not shown) is coupled to the perforating device by suitable coupling 193, one-half of which comes on the outside of the casing. The motor, while the perforator is operating, is constantly running, so that a shaft 194 in connection with the coupling 193 constantly rotates. The shaft 194 is supported by suitable bearings inside the casing and carries a pinion 195 (Fig. 12). This meshes with a large gear wheel 196 on a shaft 197 mounted in suitable bearing brackets in the casing. The pinion and gear are preferably of the helical type. The end of the shaft 197 carries one-half 198 of a clutch device. The other half of the clutch device 199 is mounted upon the end of the shaft 187 in such a manner that it can slide a slight degree axially on the said shaft but causes the shaft to rotate therewith. The shaft 187 comes in axial alignment with the shaft 197. On the shaft 187 is mounted a member 200 which carries a stop or roller 201. 202 is a lever mounted in suitable bearings in the casing, the left hand arm of which (Fig. 9) is kept pulled upwards by means of a spring 203, the movement being limited by a stop 204 so that the end thereof comes in the path of the stop 201. The other arm is subject to the upward movement of a pin 205 hereafter referred to. The half of the clutch numbered 199 has pivoted thereto at 206 a U-shaped member 207 so that one arm comes on each side of the clutch member. The clutch member is provided with a circumferential groove and inwardly projecting pins 208 on the U shaped member 207 enter these grooves. The U-shaped member is provided with a cam-like extension 209 adapted to co-operate with a fixed cam 210 on a bearing bracket 211. The extension 209 is provided with a lug 212 which is apertured and works over a headed pin 213, a compression spring 214 being arranged on the pin between the lug 212 and the member 200. The shapes of the fixed cam 210 and the extension 209 are shown in Fig. 12a, and assuming that the stop 201 can turn in a counterclockwise direction (Fig. 9), that is to say assuming the lever 202 has been moved out of the way of the said stop, then the stress in the tension spring 214 causes the lug 212 to move along the pin 213. The action is permitted by the extension 209 riding over the cam 210 and this action causes the pins 208 to bring the half 199 of the clutch into engagement with the other and rotating half 198. In this manner the shaft 187 is caused to rotate. The rotation of the shaft causes the depression of the punches as previously explained, against the action of the tension spring 215 attached to the lever member 183. When the shaft 187 is approaching a complete revolution the extension 209 rides up the fixed cam 210 and compresses the spring 214, and also effects the unclutching of the clutch parts 198, 199, which stops the drive of the shaft 187. At the same time the end of the lever 202 has come into the path of the stop 201 and the parts are held in position shown in Fig. 12.

The method of operating the lever 202 will now be described. This lever must be operated each time a key is depressed and consequently a common bar 216 is provided extending over all the rear portions 164 of the key levers. This common bar is connected by downwardly extending members to levers 217 pivoted at 218. On one side, one of the levers 217 carries a spring-controlled pivoted pawl member 219. Consequently, when the levers 217 are caused to rise the pawl member rises with them. The vertical portion of the pawl comes beneath the lower end of the sliding pin 205 and causes this to rise to lift the right hand arm (Fig. 9) of the lever 202 which causes the other end to free the stop 201, to allow the clutching of the shafts to take place as previously described. After a slight upward movement the tail 220 of the pawl 219 comes into contact with a stop 221 and trips the pawl to allow the pin 205 again to descend, which causes the spring 203 to bring the lever 202 back against the stop 204 so that the end of the lever is ready to come in the path of the stop 201.

Figure 9:
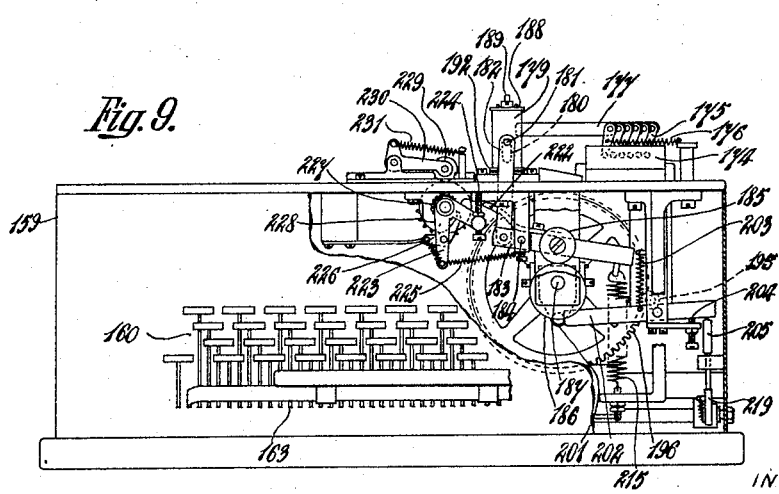
Fig. 9 shows a front elevation of Fig. 8, part of the view showing the interior of the casing broken away.

The feed of the tape from the guides 192 is effected from the lever 183. This, as shown in Fig. 9, is provided with an extension 222 co-operating with a two armed lever 223 having a stop 224 to limit its upward movement, and a spring 225 to effect the return. One arm of this lever 223 carries a pawl 226 which co-operates with a ratchet wheel 227 on a horizontal shaft, which carries a pair of toothed pin wheels 228, which project through slots in the upper plate of the casing, and enter the side perforations of the tape to effect the feed. The tape is kept pressed against the rollers 228 by a roller 229, the spindle of which is carried between two bell crank levers 230, the vertical arms of which are controlled by tension springs 231.

Any suitable means may be combined with the perforating device to prevent more than one key being depressed at a time, and to hold the other keys locked from movement during the depression of one key.

Any suitable transmitting device may be utilized for transmitting the impulses to the electro-magnets 103, the said transmitting device being operated by means of the perforated tape, which has been perforated in the apparatus just described.

The particular form of transmitting device especially suitable for the purpose is shown in Figs. 13, 14, 15 and 16. This comprises a casing 232 containing a solenoid 233, the core of which is connected to a link 234 in turn connected to a tension spring 235 anchored to the casing and adapted to keep the core pulled to the outer position. The link 234 is pivotally attached to a lever 236 pivoted at 237 to a suitable bearing carried by the casing. The lever 236 in turn is pivoted to a rod 237a with a bent round end 238 working between adjustable stops 239 and 240 suitably carried by brackets from the top of the casing. The rod 237 has pivoted thereto a lever 241 in turn pivoted at 242 to a bracket carried by the casing. Bearings 243 are arranged beneath the top of the casing for a shaft 244, which has keyed thereon a ratchet wheel 245 and pin wheels 246 which project through slots in the upper member of the casing, the pins in the said wheels being spaced apart the distance of the feeding perforations of the perforated tape. On the upper part of the casing is provided a pivoted gate 247 kept pressed downwards by a spring hinge mounted in a bracket 248. This gate is recessed on the underside for the passage of the tape 249. 250 is a spring-controlled pawl carried by the rod 237a for co-operation with the ratchet wheel 245 for effecting the feed of the tape from the device.

251 are brackets hanging beneath the upper member of the casing to support between them a spindle 252 for a number of bell crank levers 253. The horizontal arms of these levers have pivotally connected thereto pins 254 which are arranged vertically and pass through guiding apertures in the cover of the casing so that they come beneath the perforated tape. The pins are so positioned that if the tape is perforated they project through the said perforations, whereas if the tape is not perforated immediately above them, they are prevented from projecting. The vertical arms of the levers 252 are connected to sliding rods 255 working through a guide plate 256. The fronts of these rods carry contacts 257 which are adapted to co-operate with other contacts 258. Between the lever 241 and the rod 237a a bar 259 is provided. The position of the parts is such that this bar, in the position shown in Fig. 14, is adapted to come on the upper surface of the horizontally extending arms of the levers 253 which are forced against this bar by their controlling tension springs 260. The position shown in Fig. 14 is that taken up by the parts when there is no perforated tape in the apparatus, but of course it will be understood that in action a perforated strip 249 is being fed through the apparatus. Assuming that the solenoid 233 is operated, for example by being included in a circuit also including one of the rocking mercury contacts or switches 99 (Fig. 3). The core of the solenoid is attracted and this causes the lever 236 to move the rod 237a to the left, that is to bring its bent up end into contact with the stop 240. In making this movement, the bar 259 pushes down upon all the horizontal arms of the levers 253 and presses the pins 254 downwards. At the same time the pawl 250 engages the ratchet wheel 245 and by this movement causes the pin wheels 246 to move the perforated tape on one step. When the circuit from the solenoid is broken, the spring 235 withdraws the core and the rod 237a is brought back to the position shown in Fig. 15. The horizontal arms of the levers 253 are consequently allowed to rise and, as before explained, the pins 254 move upwards. Those which have perforations in alignment with their upper ends pass through the said perforations, whilst those without perforations above them are held in the downward position. As will be understood, those pins 254 which pass through perforations allow the horizontal arms of their levers 253 to move upwards to a greater extent than those which are prevented from further movement. Consequently, the vertically extending arms of these levers with the greater movement move further to the left (Fig. 14) and this again causes the contacts 257 to be brought into electrical connection with the co-operating contacts 258, whereas those levers 253 which do not have the further movement hold their associated sliding rods 255 from further movement and keep the associated contacts 257 from having electrical connection with the aligned contacts 258.

It will be understood that the electro-magnets 103 are included in the circuits of the contacts 258 so that the coded perforations in the tape control the electro-magnets 103 to be operated and thus also control the projections 151 which are to be set into operative position, in turn controlling the actual elements to be moved from the non-exhibiting to the exhibiting position. The contacts 258 are connected to the terminals 261 and the solenoids 233 to the terminals 262.

The contacts determined by the tape are subsequently completed by the actuation of the second mercury contact 99 by the cam 97.

When an error has been made in the perforating, correction is effected by the punching of a set of five holes. This may be done when the error is discovered at once by a key in the perforator itself or afterwards by a special hand punch through which the tape can be passed, and which punches rather larger holes over the existing ones. When the tape passes through the transmitter, the action is as follows:

There is resting against the contact levers inside the case of the instrument a tumbler bar carried on two levers from each end. This carries a contact piece. The bar rests against five levers and when all have moved forward through their pins passing through five holes in the plate the contact bar drops on to a contact screw. This closes the circuit of a polarized relay, which breaks the circuit of the translator magnets and momentarily shunts that of the feeding solenoid, setting the tape forward on extra space in time for the translator to make up a new setting.

A transmitting device may in some cases be used comprising a bank of keys operating universal bars and rising and falling pins, the construction being similar to that described in the perforator, Figs. 8 to 12. The rising and falling pins in place of being utilized for operating punches, are utilized for effecting desired electrical contacts which are transmitted to the operating parts.

It will be understood that the mechanism shown in Figs. 1 and 2 is in the exhibiting station, whilst the transmitter or translator shown in Figs. 13 to 16 is in the transmitting station. The exhibiting and transmitting stations may be electrically connected together in any suitable manner, the type of connection being determined by the distance apart. When however the stations are at some distance apart it is preferred to arrange the electrical circuit in accordance with Figs. 26 to 29.

The lower part of Fig. 26 represents the transmitting station and the upper part represents the exhibiting station. In the transmitting station a distributor 263 is employed, whilst in the exhibiting station is a collector 264 exactly similar to the distributor 263. The distributor and collector are of any suitable construction and each is driven in a similar manner, and the particular distributor shown in the drawings will be described. This comprises a disc 265 of insulating material shown diagrammatically in side elevation in Fig. 27, which is carried in mountings fixed to a base 266. The base carries an electric motor 267 and the disc carries a conducting ring 268 and concentrically another ring 269 of conducting material, separated by insulating portions dividing the outer ring into sections with an insulating gap between each portion. 270 is an arm mounted to turn at the centre of the disc 265, as hereafter described, and carrying two brushes 271, 272 connected together and adapted to press upon and make contact with the rings 268 and 269 when the arm 270 is rotated. This rotation is effected from the motor 267 in any suitable manner and in the construction to be described, the rotation is effected from the motor 267 which is kept running, although means are described for preventing the arm 270 from rotating when required. It is thus possible to rotate or stop the arm 270 without any necessity of interfering with the running of the motor 267. For this purpose the arm 270 is mounted upon a sleeve 273 mounted loosely upon a spindle 274 driven from a motor shaft 275 through a worm and worm wheel gearing, as shown in Fig. 27. The spindle 274 which may be mounted in ball bearings in suitable bearing brackets as shown, carries a differential gear comprising three bevel wheels 276, 277 and 278. The bevel wheel 276 is attached to the spindle 274, whilst the bevel wheel 277 is mounted on the sleeve 273, the centre bevel 278 being free on its shaft which is carried by the centre member 279 mounted loosely around the spindle 274, which member 279 has projecting therefrom an arm 280 so that this arm rotates with the member 279. The bevel 277 also carries a radially projecting arm 281. On the base plate is a sliding stop bar 282 having a projection or lug 283 which is able, when the bar is shifted lengthwise, to engage either of the arms 280 or 281, but not to engage both of the said arms at the same time.

By the above mechanism, when the motor is running if the lug 283 engages as shown on the drawings the arm 281, the arm 280 does not rotate, but as the bevel wheel 277 is held from rotation, the bevel wheel 278 rolls round it whilst engaged by the bevel 276. When, however, the stop bar 282 is moved to bring the lug to engage the arm 280, then as the bevel 278 is held from movement and can only rotate about its centre, then the bevel 277 rotates and takes with it the sleeve 273 which carries round the arm 270.

The stop bearing 282 is caused to move in one direction by means of a spring and in the other direction by an electro-magnet by means of an intermediate bell crank movement, the arrangement being such that when the electro-magnet is operated as in the perforator, the brush arm 270 is allowed one rotation only, and before another rotation is permitted, the electro-magnet must again be operated. This magnet or its relay is in series with the line and therefore, when impulses are sent from the transmitting station, both this magnet and the corresponding magnet 284 for the collector are energized, and simultaneously start the distributor 265 and the collector 264 in their respective stations.

It is essential that both the distributor and collector should move at the same speed and pick up at once. The differential gears described by their engagement ensure the pickup at once, whilst the same speed is attained by using constant speed motors (267 and 285), and when required adding governing means at the other end of the motor spindle to the worm gear before described. Such a governing means may as shown operate on the well known principle in which the motor circuit is controlled by means of a contact shunted with a resistance as shown diagrammatically in Fig. 29, the action being controlled by a centrifugal governor such as 286 (Fig. 28). Should the motor run too fast, due to the fact that the load is reduced or other cause, the contact such as 287 is broken or lightened and the resistance such as 288 more or less thrown into circuit. By this means the speed is regulated. To counteract any sudden fluctuation, a mercury fly-wheel may be employed, that is to say a slotted covered disc containing mercury is added. The speed of the motors may be checked and ascertained by stroboscopic means by markings placed around the fly-wheel or other corresponding part with a portable tuning fork having shutters with slots in the usual manner.

By the above described means, it will be seen that when the motors in the transmitting and exhibiting stations are running, the distributor and collector are caused to be operated simultaneously and in synchronism.

The arrangement of the circuits in the form shown is as follows. In the transmitting station, the transmitter or translator (Figs. 13 to 16) is represented by the numeral 289, its six contacts being marked 1, 2, 3, 4, 5, 6 respectively. From each of these a wire is connected to a segment on the outer ring of the distributor 265, these segments being marked 1 to 6. The driving solenoid 233 for the transmitter or translator is shown on the right of the lower portion of Fig. 26 and this is actuated from the exhibiting station from the contact A of the collector and through the contact A in the transmitting station. The six contacts numbered 1 to 6 of the transmitter correspond to the six magnets marked 103 in the exhibiting station, and are connected thereto through the segments numbered 1 to 5 in the transmitting station and the segments 1 to 6 in the exhibiting station.

The contacts B, B', C, C' and D, D' in the transmitting station are connected to corresponding keys similarly lettered and in the transmitting or indicating station the corresponding segments are connected to the required parts of the circuits to bring into operation the parts of the system when the keys B, B', C, C', D, D' are operated by the rotation of the distributor and collector.

The key B controls through the contacts B the starting and the key B', through the contacts B', the stopping, through the relay 289 in the exhibiting station of the collector motor 285. Simultaneously, these contacts control the starting and stopping of the motor 267 for the distributor 265. The brushes of the distributor 265 and collector 264 are so arranged that they always when at rest stop on the sections B. Consequently, when starting from rest, the first operation is always to start the distributor and collector from the key B, which thus by the movements of the distributor and collector render the other circuits available.

In a similar manner, the keys C, C', start and stop respectively the main driving motor 16, (Figs. 1, 2 and 26) in the exhibiting station through a relay 290 which actuates a contactor 291 and controls the motor 16 which is a shunt series compounded motor.

The keys and associated circuits D, D' are used when there are two means of setting the parts in the exhibiting or indicating stations as hereafter to be described, for example an ordinary setting means as described and a repeat or special setting means to be described. In this case normally the indications in the exhibiting station are repeated by actuating the key D which energizes a relay 292 and then a solenoid 293. A clutch may be thrown out of gear and puts the composer 29 into operation to be driven. The operation of the key D' effects the reverse operation.

The contacts E and F are provided on the collector 264 and distributor 265 for the purpose of signaling circuits to indicate in the transmitting station that the apparatus at the indicating station are functioning correctly. Similarly, other indicating contacts may be provided for other purposes.

The contact E in the exhibiting station is a contact on any suitable part of the code machine to transmit an indication to the sending or transmitting station to show that the machine is functioning. This contact in the exhibiting station may be associated with the jacquard return bar or on the jacquard holding bar. The contact F is utilized to show that the motor 16 is running by a centrifugally actuated contact. The circuits E and F are energized when the corresponding contacts are closed in the exhibiting station and operate signaling lamps 294 and 295 respectively at the transmitting station through suitable relays.

For simplicity, the system has been described and arranged with single polarity current, but if desired double polarity current may be used in any known manner in telegraphy and telephony and any kind of relay combination or controlling apparatus combined therewith.

In some cases, more than two contact rings can be utilized for the distributor and collector, allowing circuits to be arranged in a somewhat different manner from that described, for example with two wires and an earth.

For short distances, the system can be worked with suitable lines and the distributor and collector such as described dispensed with.

Referring to Fig. 32, this shows a front elevation of the deleting means and as before explained the endless chains 37 and 37a run in the same direction as the chains 10 and 11 and at a greater speed. The vertical bars 38 connecting the chains 37 and 37a may have springily hinged thereto in a manner similar to the hinging of the projections 251, a number of similar projections which always project outwards, or else these separate projections may be combined together in groups leaving (in the case in question) seven projecting members 296. Each of these projecting members 296 comprises a vertically extending bar with arms on each end in spring hinged relation with the rod 38, the spring hinge being provided so that in one direction the arms can turn in a cushioned manner against the spring resistance. In preferred cases the element may be furnished with a special key for co-operating with projections on the deleter bars, and with this construction, as all the special projections may come at the same horizontal elevation, a single projection only on the deleter bars is sufficient for each horizontal row of elements.

When the apparatus is working, elements which when passing through the composing device have been brought to the exhibiting position, pass on to the place where they are exhibited and then moving along the endless path come into the neighborhood of the deleting means. The lugs 57 of these elements when passing the deleting means, are acted upon by the projections 296, which, as the deleter is moving more quickly than the slats, overtake them and force these lugs 57 back to the non-exhibiting position, thus moving the element to the non-exhibiting position. It should be understood of course that the path of travel of the projections 296 with relation to the path of travel of the lugs 57 is suitably chosen to allow the operation to take place. When the lugs 57 have been brought to the non-exhibiting position, owing to the spring hinge of the projections 296, these projections spring past the lugs.

In some cases it is not required for the deleting apparatus to operate, that is to say once a desired announcement is set up by the composing means on the elements carried by the slats, the composing means is prevented from having a further action, so that the indication set up is repeatedly exhibited by the rotation of the chains 10 and 11, for a required number of times. Means are therefore provided for holding the deleter out of action at will. Such a device is shown in Figs. 30 and 31 where 297 is an endless rail mounted above the top chain 37 of the deleter. As will be seen, the tops of the bars 38, which carry the projecting members 296 or the like means are pivoted in the chain links and the pivots are extended beyond the said links. Each of these extending pivots has fixed thereto a block 299 forming an arm which carries at its free end a pivoted roller 300 mounted on the top and so arranged that the rolling surface engages with the side of the rail 297. The deleter bars 238 are mounted to turn freely in the chain links with a limited motion of about 60°, which is sufficient angular movement to permit of their being moved so that the rollers 300 can run on one side or the other of the rail. At a desired point in the travel of the chain and in a position where the deleter parts are not in action, a track switch is provided to cause the rollers 300 to change from one side to the other of the endless rail 297. When it is desired that the deleter parts should be in such a position that they carry out deleting operations they come on one side of the endless rail 297. This is the position shown on the right hand side of Figs. 30 and 31 where it will be seen that the spring pawl 298 is projecting away from the track, and it should be understood that from this position on the right the chain passes to the right, round the right hand sprocket wheel 37 (Fig. 2) to the front, and then moves to the left to come parallel with the front portion of the chain 11 (Fig. 2). As a consequence, the thrust of the lugs 57 bearing against the pawls 298 is taken by the roller 300 pressing on the surface of the rail.

When the track switch is set to open a slot in the rail 297 which slopes from the active working side, that is the outside, to the inside or idle side of the rail 297, the rollers 300 as each comes to the point is switched over to the other side of the rail, with the result that the associated bar 38 is turned and the pawls 298 thereon are brought into a non-deleting position lying parallel to the chain and underneath it as shown in the left hand side of Figs. 30 and 31, and in this position the rollers travel on the inside of the rail. When it is desired to again bring the deleter into action, the track switch is moved back into its former position, thereby closing the first slot and opening one sloping from the inside of the rail to the outside as hereafter explained.

The track switch comprises a gap in the rail 297 having two bevelled ends 301 and 302, above which is arranged a sliding plate 303, the plate carrying on the underside a short piece of rail 304 having bevelled ends parallel with the ends 301 and 302, but having a length which does not fill the gap, but always leaves a passage at one end or the other, according to the position into which it is set. The width of the passage is so arranged that it permits the rollers 300 to pass through. As will be seen the switch piece 303 is mounted to slide on the top of the rail 297 by means of slots and pins and is actuated by a cross arm 305 pivoted at one end 306 to a suitable part of the framework and engaging the switch piece 303 by a pivot 307, the other end of the arm 305 being connected to the core of a solenoid 308, a spring return being provided. The solenoid is energized in any suitable manner for example through relays actuated as before described in connection with contacts, or it may be hand operated or operated by other suitable mechanism which may be pneumatic.

The action will be readily understood, upon consideration of Figs. 30 and 31. Assuming the deleter bars 38 are moved to the right, the deleter bar which comes to the left is on the non-working side of the rail 297. In its passage it comes to the open slot, one edge of which is bounded by the inclined surface 302. It passes through this slot and reaches the other side of the rail and in so doing the rod 38 is turned to bring the pawl 298 to the projecting position, which is the position of the parts shown to the right of Fig. 31. In the reverse operation if the solenoid 308 is operated, a slot or passage is formed bounded in part by the surface 301, and any roller 300 which approaches this slot on the working side of the rail 297, passes through the slot and comes on the other side of the rail.

To render the mechanism of the switching device more positive, the mechanism shown in Fig. 32 may be provided. This comprises hinged deflectors 309 operated by pins 310 projecting into slots 311 in a plate 312 moved by the arm 305. Each of the deflectors 309 comprises a portion 313 which is adapted to be brought against the side of the track to impose an impediment on the movement of the roller 300 and to cause it to pass through the switching slot. In this manner the rollers are prevented from jumping the points and remaining on the wrong track after the action of the switching over has been taken.

Fig. 7 shows a modified method of operating the locking bar 133 for the levers 128. The construction shown differs from that shown in Fig. 5 in that means are provided for giving a positive movement to the locking bar. For this purpose a further snail cam 314 is provided on the shaft 28 and the parts come to rest in the position shown in Fig. 7. A lever 315 is provided pivoted at 316 and having a roller follower 317 pressing on the cam. The other end of the lever is provided with a tail 317 so that on the first movement of rotation of the shaft 28, the tail presses on the locking bar 133 to force this to the left (Fig. 7) to release any lever 128 held thereby, after which the roller 317 drops over the higher point of the cam 314 allowing the locking bar 133 to return ready to catch the subsequently set lever 128. The setting and shape of the cams is so chosen that the above action takes place before the cam 113 operates the lever 124 to raise the latch which has been set into the common groove.

As before explained, in some cases the elements or the like may be made photoluminescent in any suitable manner for example zinc sulphide may be utilized as the photoluminescent substance, being hermetically sealed beneath the surface of the glass or other translucent material, or it may be mixed with a water-proof or other binder or both means may be adopted; further in some cases it may be coated with celluloid instead of having a glass or other cover.

The surface to be printed upon by the light, or the light (which may be visible or invisible) may move, or both may move together for a time and then separate, the construction in all cases permitting the photoluminescent surface to be exposed for the required time to the exciting light rays, before it is exhibited.

In some cases the arrangement may be such as shown in a portion of Fig. 34. This figure diagrammatically represents a portion of Fig. 2, that is to say it shows a plan of the endless chain and slats. Towards one end a screen 463 is provided. This screen has an upper and lower member coming at the level of the chains 10 and 11, connected by a vertically arranged curved surface, which is substantially part of a hollow cylinder, so that a rectangular opening is left facing the elements as they pass by. The screen is suitably supported and carries on the interior powerful sources of light such as electric lamps 464 of required type, for instance lamps with a filling of inert gas and tungsten filaments. The rectangular opening of the screen if desired may have a required filter to allow the desired rays of light to pass.

The elements that it is desired to excite in this system are moved from the non-exhibiting to the exhibiting position prior to coming under the influence of the lights in the screen 463. As they pass under the influence of this light, the photoluminescent substance or substances carried thereby are excited so that after passing from the screen, the elements are photoluminescent, and show the required indication. It should here be stated that the position of the screen 463 will be so chosen that when the elements pass therefrom it is preferred that they should pass directly to the exhibiting position, and it should be remarked that the screen is only shown in diagrammatic condition in Fig. 34. After passing from the exhibiting position, it will be realized that if required the excited elements may be subjected to other sources of light of different wave length to damp out the photoluminescence, or such photoluminescence may fade gradually.

Another method of exciting the elements by what may be termed "spot-light" printing is also shown somewhat diagrammatically in Figs. 34, 35 and 36. For this purpose a double endless chain system is provided, smaller than but somewhat similar to that for carrying the slats is provided. In Fig. 34 only the top chain 465 with top sprockets 466 and 467 are shown. The two sprockets are mounted on shafts 468 and 469 respectively and these shafts are suitably supported in brackets. The shaft 468 carries a gear wheel 470 meshing with another gear wheel 471 carried by the base, upon the spindle of which is arranged a sprocket wheel geared by a chain 472 with a sprocket 473 towards the lower end of the shaft 4. The gears are so chosen that the chain 463 where it comes adjacent the chains 10 and 11, moves parallel thereto and at the same speed, the same holding good for the lower chains. Between the chains 65 and the lower chain are arranged slat members 474 and in apertures therein these carry devices shown at Fig. 35 comprising a cylindrical housing 475 to enter the aperture and be retained therein, for example in the manner described with reference to the elements. Each housing has pivoted thereto a yoke member 476 carrying a projecting lug 477 resembling the lugs 57 hereinbefore described. At the front the casing 475 is extended into a hollow shade member 477a having an open end 478 and containing an electric lamp 479 of required kind. It should be understood that the lamps and shade members are arranged on the slats 474 in vertical rows of seven and that five adjacent slats carry these lamps and shades, grouped in an exactly similar manner to the grouping of the elements 39. Moreover, the gearing is so chosen that a group of elements and a group of lamps and shades come into coincidence as the parts rotate. In this manner thirty-five lamps and shades are brought into coincidence with thirty-five elements.

In the construction described, the elements need not be turned from the exhibiting to the non-exhibiting position but may always remain in the exhibiting position and if required composing means need not be associated with the elements but the composing means may be associated with the lamps so that in each group, as it comes into coincidence with the elements, required lamps may be lit. As the elements have photoluminescent material thereon, the lamps which have been lit in traveling along cause the elements coming into coincidence therewith to be excited. The groups of elements, some of which are excited, then pass to the exhibiting position as before explained. The lamps which have been lit, when they come out of coincidence with the elements are extinguished by suitable deleting means combined with the gyratory lamp system.

A switching means for the lamp is shown in Figs. 35 and 36 and this comprises a rocking mercury contact 480 having contacts 481 included in the lamp circuit and suitably connected with a source of power. The mercury contact is carried by a rocking member 482 of insulating material and a projection 483 therefrom co-operates with a projection 484 carried by one arm of the yoke 476, so that as the yoke is moved from side to side the rocking piece 482 is rocked from one side to the other. In one position, that shown in Fig. 36, the circuit through the lamp is broken, but when it is rocked to the other position, the mercury in the contact 480 bridges the gap and establishes the circuit to light the lamp. The current for all the lamp circuits is picked up by brushes and insulating strips with which they engage as the slats 469 travel parallel to the slats 12. Although the spot printing has been described with reference to the elements, it is obvious that the surface to be printed upon may conveniently be a plate or a band or a series of plates or slats, which may be mounted in the form of an endless loop or the like. The speed of travel determines the time in which the light is applied to the photoluminescent material as well as the distance in which the light travels in coincidence therewith and in some cases means may be provided for slowing down the parts or stopping them for a period, to give the required time of excitation.

In some cases in place of separate lamps, which are lit and extinguished to cause the excitation, a series of shutters may be employed to be closed and opened to allow light from any suitable source to pass to the surface to be excited, such shutters being carried by fixed members or by traveling members.

The systems above described are especially useful for making announcements in darkness or shade, the sulphides or the like used having preferably as long and bright an afterglow as possible.

The design may be in light or shade, produced by excitation or non-excitation with light or by damping down on an excited surface. It will be understood that the excited sulphide has to return to its normal state before it can be re-used. This may by its own action take a long time.

Means are utilized for facilitating this and as photoluminescence can be interfered with by light waves, this principle is put to practical use for damping out the impressions previously made by the light on the surface. It has been found by experiment with a number of screens that an effective one for the purpose transmits waves of light from .6µ downwards with increasing wave lengths, which are given by way of example only. When the surfaces have been excited or printed on by screened or unscreened visible or invisible light and used as long as required, they are exposed to light of a suitable wave length which restores them to their normal state for reprinting. This is shown in the case of traveling units having slats or bands or other moving parts as herein described by allowing them to pass at the end of their path (before they again come to the printing device) in front of a source of light having a suitable screen; in the case of a stationary surface one beam may be utilized for excitation and another for damping purposes. The difference in physical characteristics existing between fluorescent substances which glow only when excited by light and those which continue to glow afterwards may be utilized in devices operating according to the invention, so that part of the design may appear or disappear in contradistinction to the rest.

Although with all the forms of the device the exhibiting part has been described as seen by direct vision, in some cases where required the exhibition may be viewed by reflection and the elements or other exhibiting parts may be suitably arranged for the purpose, such as to be run in a horizontal plane round a reflecting means. In preferred arrangements, according to this modification, the elements and parts cannot be seen directly but only by reflection. In some cases shutter elements may pass the light on to the reflector. The reflecting means may have combined therewith any other permanent indication ornament or otherwise and may be illuminated directly or by reflection.

In Figure 37, I have illustrated one manner of carrying out the exhibition by reflection, and reference is now made to this figure for a clear understanding of the operation thereof. A frame 600 mounted between the base 1 and runway 15 is provided and preferably extends the full length of the mechanism carrying the display elements 39. As clearly shown in Figure 37, the frame 600 has an angular formation, thus presenting a reflector support 601 upon which a reflecting member 602 is secured, the reflecting surface of which is presented toward the elements 39. With the device in operation, it will be clearly apparent that the elements 39 as embodied upon the slats 12 will, during movement of the slats before the reflector 602 display the elements 39 thereupon and will be projected downwardly as indicated by the dotted lines 603.

In some cases the photoluminescent materials for the exhibiting surfaces or elements may be combined with radio-active substances or substances possessing radio-active properties, the radio-active substances or substance acting as the exciting source in place of light. In a somewhat similar arrangement, the radio-active substance or substances may be independent of the luminescent substance or substances and act as the exciting agent upon the luminescent substance or substances.

The invention is not limited to the precise forms or details of construction described, as these may be varied to suit particular cases.

What I claim and desire to secure by Letters Patent of the United States of America is:—

1. Advertising, signaling, indicating and display devices of the type set forth comprising display elements adapted to become visible by photoluminescence, exciting means for rendering the elements photoluminescent, means for relatively positioning the exciting means and display elements for exciting the display elements, means for selecting the display elements to be excited, and means for causing the display elements to pass from the exciting to the exhibiting position for the purposes set forth.

2. Advertising, signaling, indicating and display devices of the type set forth comprising display elements adapted to become visible by photoluminescence, exciting means for rendering the elements photoluminescent, means for relatively positioning the exciting means and display elements for exciting the display elements, means for selecting the display elements to be excited, means for causing the display elements to pass from the exciting to the exhibiting position, and means for rendering the excited elements non-luminous, for the purposes set forth.

3. Advertising, signaling, indicating and display devices of the type set forth comprising display elements adapted to become visible by photoluminescence, a source of light of desired wave length, means for bringing the source of light and the display elements into desired relative positions, for exciting the display elements, means for selecting the display elements to be excited, and means for causing the display elements to pass from the exciting to the exhibiting position, for the purposes set forth.

4. Advertising, signaling, indicating and display devices of the type set forth comprising display elements adapted to become visible by photoluminescence, a source of light of desired wave length, means for bringing the source of light and the display elements into desired relative positions for exciting the display elements, means for selecting the display elements to be excited, means for causing the display elements to pass from the exciting to the exhibiting position, means for damping out the luminescence of the display elements, and means for bringing the display elements into desired relative position with the damping out means, for the purposes set forth.

5. Advertising, signaling, indicating and display devices of the type set forth comprising display elements adapted to become visible by photoluminescence, a plurality of sources of light of desired wave length, means for bringing the sources of light and display elements into desired relative positions for exciting the display elements, means for selecting the display elements to be excited, and means for causing the display elements to pass from the exciting to the exhibiting position, for the purposes set forth.

6. Advertising, signaling, indicating, and display devices of the type set forth comprising display elements adapted to become visible by photoluminescence, means for moving the display elements in a desired path, a plurality of sources of light of desired wave length, means for moving the plurality of sources of light in a desired path, a portion of which path is coincident with the path of the display elements, means for bringing the sources of light to register with the display elements whilst moving in coincidence therewith, means for selecting the display elements to be excited, and means for causing the display elements to pass from the exciting to the exhibiting position, for the purposes set forth.

7. Advertising, signaling, indicating and display devices of the type set forth comprising display elements adapted to become visible by photoluminescence, means for moving the display elements in a desired path, a plurality of sources of light of desired wave length, means for moving the plurality of sources of light in a desired path, a portion of which is coincident with the path of the display elements, means for bringing the sources of light to register with the display elements whilst moving in coincidence therewith, means for selecting the sources of light to be rendered operative as exciting means, and means for causing the display elements when excited to pass from the exciting to the exhibiting position, for the purposes set forth.

8. Advertising, signaling, indicating and display devices of the type set forth comprising display elements adapted to become visible by photoluminescence, means for moving the display elements in a desired path, a plurality of sources of light of desired wave length, means for moving the plurality of sources of light in a desired path, a portion of which path is coincident with the path of the display elements, means for bringing the sources of light to register with the display elements whilst moving in coincidence therewith, selectively operated jacquard means for selecting the sources of light to be rendered operative as exciting means, and means for causing the display elements when excited to pass from the exciting to the exhibiting position, for the purposes set forth.

9. Advertising, signaling, indicating and display devices of the type set forth comprising display elements adapted to become visible by photoluminescence, means for moving the display elements in a desired path, an endless band of slats, driving means for causing the endless band to move in a desired path, a portion of which is coincident with the path of the display elements, a plurality of electric lamps carried by the said slats, means for bringing the lamps into register with the display elements whilst moving in coincidence therewith, means for concentrating the light from the lamps upon the display elements, an electric circuit including the said lamps, a source of power in said circuit, selectively operated jacquard switching means for selecting the lamps to be lit to act as exciting means, and means for causing the display elements when excited to pass from the exciting to the exhibiting position, for the purposes set forth.

10. Advertising, signaling, indicating and display devices of the type set forth comprising display elements adapted to be moved to exhibiting positions, a selector, setting means for the display elements including a plurality of actuating members adapted to be selectively set in operative or inoperative positions according to the setting of the selector, means for causing relative movement between the display elements and the said selectively operated setting means, means associated with the elements adapted to be operated by those of the said actuating members which have been selectively set into the operative position, and means for reflecting the advertisement, signal, indication or display to the observer.

11. Advertising, signaling, indicating and display devices of the type set forth comprising display elements adapted to become visible by photoluminescence, exciting means for rendering the elements photoluminescent, means for bringing the exciting means into position for exciting the display elements, means for selecting the display elements to be excited, means for causing the display elements to pass from the exciting to the exhibiting position, and means for reflecting the advertisement, signal, indication or display to the observer.

12. Advertising, signaling, indicating and display devices of the type set forth comprising elements adapted to be moved to exhibiting positions, electrically operated selecting means, means for transmitting electrical impulses of desired types to the said electrically operated selector, setting means for the display elements including a plurality of jacquard members, means for setting the jacquard members into operative or inoperative positions, according to the setting of the electrically operated selector, means for causing relative movement between the display elements and the jacquard members, means associated with the elements adapted to be operated by those of the said jacquard members which have been set into the operative position, deleting means relatively movable with respect to the display elements for returning the display elements from the exhibiting to the non-exhibiting position, and unitary means for driving the jacquard setting means for causing relative motion between the display elements and the jacquard members and the means for moving the deleting means with respect to the display elements.

13. Advertising, signaling, indicating and display devices of the type set forth comprising elements adapted to be moved to exhibiting positions, electrically operated selecting means, means for transmitting electrical impulses of desired types to the said electrically operated selector, setting means for the display elements including a plurality of jacquard members, means for setting the jacquard members into operative or inoperative positions, according to the setting of the electrically operated selector, means for causing relative movement between the display elements and the jacquard members, means associated with the elements adapted to be operated by those of the said jacquard members which have been set into the operative position, deleting means relatively movable with respect to the display elements for returning the display elements from the exhibiting to the non-exhibiting position, and unitary means for driving the jacquard setting means for causing relative motion between the display elements and the jacquard members and the means for moving the deleting means with respect to the display elements, said unitary driving means being adapted to actuate the deleting moving means in the same direction and at a greater rate of speed than the display elements for engagement with said display elements for the actuation thereof.

14. Advertising, signaling, indicating and display devices of the type set forth comprising elements adapted to be moved to exhibiting positions, electrically operated selecting means, means for transmitting electrical impulses of desired types to the said electrically operated selector, setting means for the display elements including a plurality of jacquard members, means for setting the jacquard members into operative or inoperative positions, according to the setting of the electrically operated selector, means for causing relative movement between the display elements and the jacquard members, means associated with the elements adapted to be operated by those of the said jacquard members which have been set into the operative position, deleting means relatively movable with respect to the display elements for returning the display elements from the exhibiting to the non-exhibiting position, unitary means for driving the jacquard setting means for causing relative motion between the display elements and the jacquard members and the means for moving the deleting means with respect to the display elements, and mechanical timing means associated with said unitary driving means for synchronizing movements of the jacquard members with the other portions of the device.

15. Advertising, signaling, indicating and display devices of the type set forth comprising elements adapted to be moved to exhibiting positions, electrically operated selecting means, means for transmitting electrical impulses of desired types to the said electrically operated selector, setting means for the display elements including a plurality of jacquard members, means for setting the jacquard members into operative or inoperative positions, according to the setting of the electrically operated selector, means for causing relative movement between the display elements and the jacquard members, means associated with the elements adapted to be operated by those of the said jacquard members which have been set into the operative position, deleting means relatively movable with respect to the display elements for returning the display elements from the exhibiting to the non-exhibiting position, unitary means for driving the jacquard setting means for causing relative motion between the display elements and the jacquard members and the means for moving the deleting means with respect to the display elements, and a gear mechanism interposed between said unitary driving means and the driven portions of the device for synchronizing the movements of said jacquard member with the remaining portions of the device.

16. Advertising, signaling, indicating and display devices of the type set forth comprising elements adapted to be moved to exhibiting positions, electrically operated selecting means, means for transmitting electrical impulses of desired types to the said electrically operated selector, setting means for the display elements including a plurality of jacquard members, means for setting the jacquard members into operative or inoperative positions, according to the setting of the electrically operated selector, means for causing relative movement between the display elements and the jacquard members, means associated with the elements adapted to be operated by those of the said jacquard members which have been set into the operative position, deleting means relatively movable with respect to the display elements for returning the display elements from the exhibiting to the non-exhibiting position, unitary driving means for actuating the jacquard setting means, means for causing relative movement between the display elements and the jacquard members and the deleting means, a timing gear associated with said unitary driving means for synchronizing the movements of said jacquard members with the remaining portions of the device, and a switch controlled by said timing gear in circuit with the means for transmitting electrical impulses for synchronizing the movements of said means for transmitting electrical impulses with the electrical operating selecting means.

17. Advertising, signaling, indicating and display devices of the type set forth comprising elements adapted to be moved to exhibiting positions, electrically operated selecting means, means for transmitting electrical impulses of desired types to the said electrically operated selector, setting means for the display elements including a plurality of jacquard members, means for setting the jacquard members into operative or inoperative positions, according to the setting of the electrically operated selector, means for causing relative movement between the display elements and the jacquard members, means associated with the elements adapted to be operated by those of the said jacquard members which have been set into the operative position, deleting means relatively movable with respect to the display elements for returning the display elements from the exhibiting to the non-exhibiting position, unitary driving means for actuating the jacquard setting means, means for causing relative movement between the display elements and jacquard members and the deleting means, a timing gear associated with said unitary driving means for synchronizing the movements of said jacquard setting means with the remaining portions of the device, a cam controlled by the timing gear, and rocking mercury switches controlled by the cam in circuits controlling the operation of said means for transmitting electrical impulses, said means for transmitting electrical impulses consisting of a code transmitter having electro-magnets in circuit with said switches.

18. Advertising, signaling, indicating and display devices of the type set forth comprising elements adapted to be moved to exhibiting positions, electrically operated selecting means, means for transmitting electrical impulses of desired types to the said electrically operated selector, setting means for the display elements including a plurality of jacquard members, means for setting the jacquard members into operative or inoperative positions, according to the setting of the electrically operated selector, means for causing relative movement between the display elements and the jacquard members, means associated with the elements adapted to be operated by those of the said jacquard members which have been set into the operative position, deleting means relatively movable with respect to the display elements for returning the display elements from the exhibiting to the non-exhibiting position, unitary driving means for driving the means for setting the jacquard members, means for causing relative movement between the display elements and jacquard members and the deleting means, a timing gear associated with said unitary driving means for synchronizing the movements of said jacquard setting means with the remaining portions of the device and means for synchronizing the operations of said selector with said means for transmitting electrical impulses comprising electro-magnets in said means for transmitting electrical impulses for effecting the operation of said means for transmitting electrical impulses, other electromagnets comprised in the circuits of other operative portions of the means for transmitting electrical impulses, and rocking mercury switches controlled in their movements by said timing means comprised in said electro-magnet circuits.

19. Advertising, signaling, indicating and display devices of the type set forth comprising elements adapted to be moved to exhibiting positions, electrically operated selecting means, means for transmitting electrical impulses of desired types to the said electrically operated selector, setting means for the display elements including a plurality of jacquard members, means for setting the jacquard members into operative or inoperative positions, according to the setting of the electrically operated selector, means for causing relative movement between the display elements and the jacquard members, means associated with the elements adapted to be operated by those of said jacquard members which have been set into the operative position, deleting means relatively movable with respect to the display elements for returning the display elements from the exhibiting to the non-exhibiting position, means for setting and retaining the deleter in the operative or inoperative positions consisting of a rail, deleter bars carrying projections, means in connection with the said bars for running on one side or other of the rail, and switching means for causing the last mentioned means to be moved from one side to the other of the rail for performing the setting of said deleter in the operative and inoperative positions.

20. Advertising, signaling, indicating and display devices of the type set forth comprising display elements including shutters adapted to be operated into exhibiting positions, setting means for the shutters of the display elements including actuating members adapted to be set in operative or inoperative positions, means for causing relative movement between the display elements and the said setting means, means associated with the elements adapted to be operated by those of the said actuating members which have been set into operative position, the shutters being movable parallel to the face of the element to expose or cover its surface for accomplishing the exhibiting operation adapted for operation by the actuating members.

21. Advertising, signaling, indicating and display devices of the type set forth comprising display elements including shutters adapted to be operated into exhibiting positions, setting means for the shutters of the display elements including actuating members adapted to be set in operative or inoperative positions, means for causing relative movement between the display elements and the said setting means, means associated with the elements adapted to be operated by those of the said actuating members which have been set into operative position, said shutter means comprising a blind of flexible material having in one operative position a cutaway portion adapted to expose the element and in another operative position a closed portion adapted to screen the element for accomplishing the exhibiting operation, said shutters being arranged for operation by said actuating members.

22. Advertising, signaling, indicating and display devices of the type set forth comprising display elements including shutters adapted to be operated into exhibiting positions, setting means for the shutters of the display elements including actuating members adapted to be set in operative or inoperative positions, means for causing relative movement between the display elements and the said setting means, means associated with the elements adapted to be operated by those of the said actuating members which have been set into operative position, said shutters comprising a blind of flexible material adapted to pass over rollers, a yoke connected to said blind for controlling the movements thereof, and means associated with said yoke for operating the same, said means being adapted for actuation by the setting means.

23. Advertising, signaling, indicating and display devices of the type set forth comprising display elements adapted to be operated into exhibiting positions, setting means for the display elements including actuating members adapted to be set in operative or inoperative positions, means for causing relative movement between the display elements and the said setting means, means associated with the elements adapted to be operated by those of the said actuating members which have been set into operative position, said display elements having photoluminescent surfaces, and radio-active substances adapted to project on said photoluminescent surfaces for accomplishing the display.

24. Advertising, signaling, indicating and display devices of the type set forth comprising display elements adapted to be operated into exhibiting positions, setting means for the display elements including actuating members adapted to be set in operative or inoperative positions, means for causing relative movement between the display elements and the said setting means, and means associated with the elements adapted to be operated by those of the said actuating members which have been set into operative position, said elements having photoluminescent surfaces adapted for excitation by radio-active substances.

25. Advertising, signaling, indicating and display devices of the type set forth comprising display elements adapted to be operated into exhibiting positions, setting means for the display elements including actuating members adapted to be set in operative or inoperative positions, means for causing relative movement between the display elements and the said setting means, and means associated with the elements adapted to be operated by those of the said actuating members which have been set into operative position.

In witness whereof I affix my signature.
HENRY KINGSFORD HARRIS.